(12) United States Patent
Nakashima et al.

(10) Patent No.: US 7,720,392 B2
(45) Date of Patent: May 18, 2010

(54) DIFFERENTIAL QUADRATURE PHASE-SHIFT MODULATOR AND METHOD FOR SETTING DRIVING VOLTAGE THEREOF

(75) Inventors: Hisao Nakashima, Kawasaki (JP); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 524 days.

(21) Appl. No.: 11/274,824

(22) Filed: Nov. 16, 2005

(65) Prior Publication Data

US 2007/0047969 A1 Mar. 1, 2007

(30) Foreign Application Priority Data

Aug. 31, 2005 (JP) ............................. 2005-252172

(51) Int. Cl.
  *H04B 10/04* (2006.01)
  *H04B 10/00* (2006.01)
(52) U.S. Cl. ...................... 398/198; 398/158; 398/185; 398/197
(58) Field of Classification Search ................. 398/158, 398/183, 185, 192, 193, 198, 195, 196, 197
  See application file for complete search history.

(56) References Cited

U.S. PATENT DOCUMENTS

| | | | |
|---|---|---|---|
| 6,278,539 | B1 | 8/2001 | Ooei et al. |
| 6,362,913 | B2 | 3/2002 | Ooei et al. |
| 2001/0007508 | A1 | 7/2001 | Ooei et al. |
| 2004/0081470 | A1 | 4/2004 | Griffin .......................... 398/188 |
| 2004/0113060 | A1 | 6/2004 | Nabeyama et al. |
| 2004/0161249 | A1 | 8/2004 | Suda et al. |
| 2005/0036725 | A1 | 2/2005 | Leuthold et al. |
| 2005/0111853 | A1 | 5/2005 | Kawanishi et al. |
| 2006/0127102 | A1* | 6/2006 | Roberts et al. .............. 398/182 |
| 2006/0127104 | A1* | 6/2006 | Harley et al. ................ 398/198 |
| 2006/0140541 | A1* | 6/2006 | Gorni et al. .................. 385/50 |

FOREIGN PATENT DOCUMENTS

| | | |
|---|---|---|
| EP | 0 547 394 | 6/1993 |
| EP | 0 881 526 | 12/1998 |
| JP | 62-143346 | 9/1987 |
| JP | 03-075615 | 3/1991 |
| JP | 07-050694 | 2/1995 |
| JP | 09-162811 | 6/1997 |

(Continued)

OTHER PUBLICATIONS

"Agilent 84904, 6, 7K/L Programmable Step Attenuators" Data Sheet, Agilent Technologies, pp. 1-8, Jan. 14, 2004.

(Continued)

*Primary Examiner*—Dalzid Singh
(74) *Attorney, Agent, or Firm*—Staas & Halsey LLP

(57) ABSTRACT

The present invention is directed toward a method for setting a driving voltage of a differential quadrature phase-shift modulator, this method making signal quality superior in response to an individual difference in extinction ratio due to variations in manufacture of a device. To this end, signal quality of differential quadrature phase-shift modulated light output from a differential quadrature phase-shift modulator is acquired. An average amplitude of a first or second driving voltage signal is adjusted according to the signal quality of the thus-acquired differential quadrature phase-shift modulated light.

26 Claims, 27 Drawing Sheets

FOREIGN PATENT DOCUMENTS

| | | |
|---|---|---|
| JP | 2000-162563 | 6/2000 |
| JP | 2001-324732 | 11/2001 |
| JP | 2002-152293 | 5/2002 |
| JP | 2004-112090 | 4/2004 |
| JP | 2004-516743 | 6/2004 |
| JP | 2004-247968 | 9/2004 |
| JP | 2004-252386 | 9/2004 |
| JP | 2005-134897 | 5/2005 |
| JP | 2005-215196 | 8/2005 |
| WO | WO 03/049333 | 6/2003 |

OTHER PUBLICATIONS

"Datasheet SHF 100 APP Broadband Amplifier", SHF Communication Technologies AG, Revision 2.1, Sep. 4, 2002.

Office Action mailed on Jul. 1, 2008 and issued in corresponding Japanese Patent Application No. 2005-252172.

R. A. Griffin, "Integrated DQPSK transmitters", Optical Fiber Communication Conference, 2005, Technical Digest, Mar. 6, 2005, pp. 91-93.

S. K. Ibrahim et al., "Non-magnetic 30dB integrated optical isolator in III/V material", Electronics Letters, Sep. 30, 2004, vol. 40, No. 20, pp. 1293-1294.

Extended European Search Report, mailed May 8, 2008 and issued in corresponding European Patent Application No. 05025631.2-1288.

European Patent Office Communication and Partial Search Report dated Nov. 2, 2007.

Notice for Reasons for Rejection for corresponding Japanese Application 2005-252172; mailed Mar. 3, 2009.

\* cited by examiner

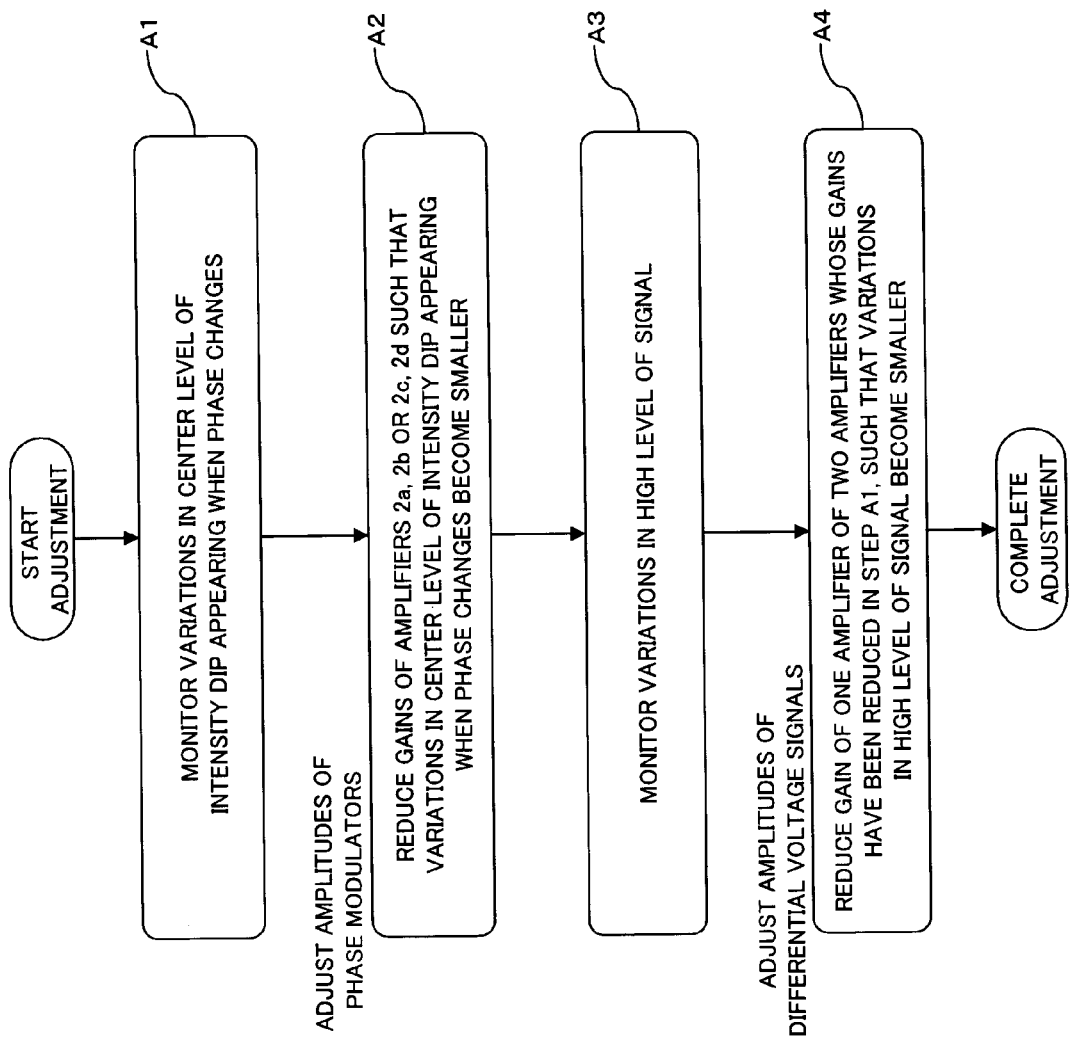

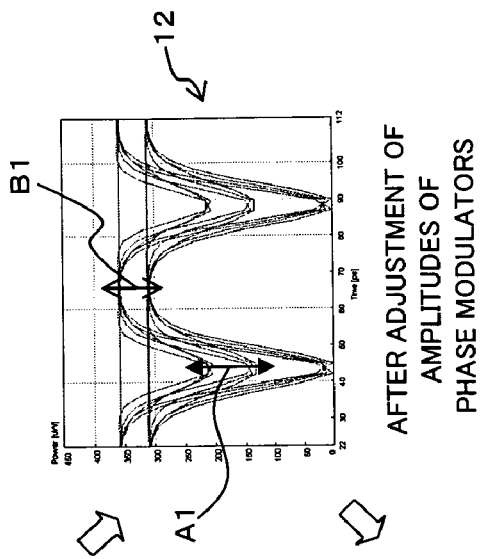
FIG. 4(B) AFTER ADJUSTMENT OF AMPLITUDES OF PHASE MODULATORS
FIG. 4(A) BEFORE ADJUSTMENT
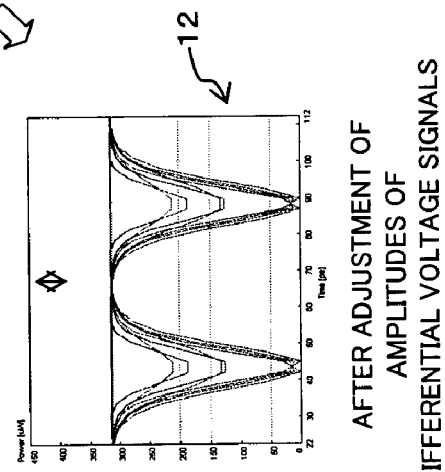
FIG. 4(C) AFTER ADJUSTMENT OF AMPLITUDES OF DIFFERENTIAL VOLTAGE SIGNALS

DIFFERENTIAL QUADRATURE PHASE-SHIFT MODULATOR AND METHOD FOR SETTING DRIVING VOLTAGE THEREOF

BACKGROUND OF THE INVENTION

1) Field of the Invention

The present invention relates to differential quadrature phase-shift modulator suitable for use in a transmitter of an optical transmission system, as well as to a method for setting a driving voltage of the differential quadrature phase-shift modulator.

2) Background of the Invention

In recent years, increasing demand has arisen for introduction of a 40-Gbit/s optical transmission system of the next generation. In addition, a transmission distance and frequency utilization efficiency equivalent to those achieved by a 10 Gbit/s system have been sought. In an effort to meet such demands, brisk research and development has been carried out on a DPSK (Differential Phase Shift Keying) modulation scheme, which is superior to an NRZ (Non-Return to Zero) modulation scheme having hitherto been applied to a system of 10 Gb/s or less in terms of optical-signal-to-noise ratio (OSNR) resistance and nonlinear resistance. In addition to research and development of the above-described modulation scheme, research and development of a phase modulation scheme called DQPSK (Differential Quadrature Phase-Shift Keying) modulation (differential 4-phase-shift modulation) having a feature of a narrow spectrum (high-frequency utilization efficiency) has also become brisk.

Particularly, the DQPSK modulation scheme is for simultaneously transmitting two phase-shift digital signals through use of signal light of a single frequency. According to this scheme, a pulse-repetition frequency (e.g., 20 GHz), which is one-half the speed (e.g., 40 Gbit/s) of data to be transmitted, is sufficient, and hence a spectrum width of a signal is reduced to one-half that achieved by the conventional NRZ modulation scheme. Thus, the DQPSK modulation scheme is superior in terms of frequency utilization efficiency, wavelength dispersion resistance, and a device transmission property. For these reasons, in the field of optical transmission systems, application of this modulation scheme to a high-speed transmission system whose data speed exceeds 40 Gbit/s has been actively investigated.

FIG. 21 is a view showing a BPSK modulator 110. The BPSK modulator 110 shown in FIG. 21 is provided in, e.g., an optical transmitter which transmits an optical signal in an optical transmission system and is for modulating a data signal into an optical signal by means of the DPSK modulation scheme. The BPSK modulator 110 has a transmission data processing section 111, an amplifier 112, a CW (continuous wave) light source 113, and a phase modulator 114.

The transmission data processing section 111 is for performing transmission data processing, such as encoding, or the like, of data to be transmitted. The data signal output from the transmission data processing section 111 is amplified by the amplifier 112, and the thus-amplified data signal is input to the phase modulator 114. The phase modulator 114 subjects the continuous light output from the CW light source 113 to phase modulation by use of the encoded data input from the transmission data processing section 111 by way of the amplifier 112.

The phase modulator 114 comprises a Mach-Zehnder waveguide 114a, and modulation electrodes 114b-1, 114b-2 formed on respective waveguides which have been bifurcated by the Mach-Zehnder waveguide 114a. The phase modulator 114 further comprises a π phase-shift section 114c formed in a stage subsequent to the modulation electrode 114b-2 on one of the waveguides bifurcated by the Mach-Zehnder waveguide 114a.

Here, the continuous light (see FIG. 22A) that has exited the CW light source 113 and propagates through an upper waveguide, in the drawing, of the two waveguides bifurcated by the Mach-Zehnder waveguide 114a is modulated by a drive signal (a data signal output from the transmission data processing section 111) to be applied to the modulation electrode 114b-1. A phase component "0" is as signed to data "0," and a phase component "π" is assigned to data "1", whereby the light becomes an optical signal (see FIG. 22B and $E_U$ therein).

The continuous light (see FIG. 22A) propagating through a lower waveguide, in the drawing, of the waveguides bifurcated by the Mach-Zehnder waveguide 114a is modulated by a drive signal (an inverted signal consisting of the data signal applied as a drive signal to the modulation electrode 114b-1) applied to the modulation electrode 114b-2. The thus-modulated signal is then subjected to phase-shifting by a phase π in the π phase-shift section 114c. The phase component "0" is assigned to data "0", and the phase component "π" is assigned to data "1", whereby the light becomes an optical signal (see FIG. 22C and EL therein).

Thereby, the optical signals EU, EL propagating through the bifurcated waveguides that form the Mach-Zehnder waveguide 114a are merged, so that an optical signal whose light intensity is constant and whose information is superimposed on binary optical phases (0 and π); namely, an optical signal EOUT having been subjected to BPSK modulation, can be output as shown in FIG. 22D.

Next, there is shown an overview of a common configuration for transmitting data through the modulation and demodulation complying with the DQPSK scheme. Details of the configuration are described in, e.g., Published Japanese Translation of a PCT Application, No. 2004-516743, as well.

FIG. 23 is a view showing a common DQPSK modulator 130. The DQPSK modulator 130 shown in FIG. 23 is also provided in an optical transmitter, and modulates the data signal into an optical signal by means of the DQPSK modulation scheme. The DQPSK modulator has a transmission data processing section 131; amplifiers 132-1, 132-2; a CW (Continuous Wave) light source 133; a π/2 shifter 134; two Mach-Zehnder phase modulators 135-1, 135-2; and an MZM interferometer 136 for causing interference between the phase-modulated signals output from the phase modulators 135-1, 135-2, which differ from each other by a phase of π/2.

Specifically, the CW light source 133 is connected to an input side of the MZM interferometer 136, and phase modulators 135-1, 135-2 are formed in the respective bifurcated waveguides. In the following descriptions, the Mach-Zehnder waveguide forming the MZM interferometer 136 is sometimes described as a master MZ (Mach-Zehnder) waveguide. Like the phase modulators 135-1 and 135-2, Mach-Zehnder waveguides forming the phase modulators made in the bifurcated waveguide sections constituting the master MZ waveguide are sometimes described as slave MZ waveguides.

Here, the transmission data processing section 131 has the function of a framer or an FEC encoder, as well as the function of a DQPSK precoder which effects encoding operation reflecting encoding information about a difference between the code of current data and the code of data preceding the current data by one bit. The transmission data signal output from the transmission data processing section 131 is output as signals which are separated into encoded data of 20 Gbit/s of two channels (data #1, data #2), in connection with the encoded data of 40 Gbit/s. Alternatively, the amplifiers 132-1, 132-2 amplify data #1, data #2 of the encoded data and output the amplified data as drive signals to the phase modulators 135-1, 135-2.

Although the CW light source 133 outputs continuous light, the continuous light output from the CW light source 133 is bifurcated by the bifurcated waveguides forming the MZM interferometer 136. One light beam of the bifurcated light beams is input to the phase modulator 135-1, and the other light beam is input to the phase modulator 135-2. Each of the phase modulators 135-1, 135-2 has a configuration basically analogous to that of the phase modulator 114 shown in FIG. 21.

Here, as in the previously-described case shown in FIG. 22, the phase modulator 135-1 modulates the continuous light output from the CW light source 133 (see FIG. 25A) by use of the encoded data set (data #1) of one channel output from the transmission data processing section 131, thereby outputting an optical signal whose information is superimposed on a binary optical phase (0 rad or π rad) (see FIG. 25B).

Moreover, the phase modulator 135-2 modulates the continuous light from the CW light source 133 (see FIG. 25A) by use of the encoded data set of the other channel (the data #2) output from the transmission data processing section 131, and the thus-modulated optical signal is subjected to phase-shifting by $\phi=\pi/2$ in the π/2 shifter 134. As a result, an optical signal whose information is superimposed on the binary optical phase (π/2 rad or 3π/2 rad) is output (see FIG. 25C).

The modulated light beams output from the above-described phase modulators 135a, 135b are merged by a merging waveguide forming the MZM interferometer 136, and the thus-merged light is output. Specifically, as a result of the modulated light beams output from the phase modulators 135-1, 135-2 being merged together, an optical signal which has constant light intensity and whose information is superimposed on optical phases of four values (π/4, 3π/4, 5π/4, and 7π/4); namely, an optical signal having been subjected to DQPSK modulation, can be output.

As mentioned above, during DQPSK modulation, digital signals of two channels, whose data "0 and "1" have been modulated into phase 0 and phase π, are caused to interfere with each other while being shifted from each other by π/2, to thus effect optical transmission by use of symbols of four values π/4(0, 0), 3π/4(1, 0), 5π/4(1, 1), and 7π/4(0, 1). In this case, when a change has arisen in the values of the data of two channels (a change from "0" to "1" or from "1" to "0"), the phases of the modulated light are switched. Therefore, dips arise in the intensity of light as designated by A to D shown in FIG. 24.

For instance, when both values of the data sets of two channels change (see B which changes from 5π/4 to π/4 in FIG. 24 and D which changes from 7π/4 to 3π/4 in FIG. 24), there arise comparatively large dips in intensity, which lowers to the neighborhood of a low level. In contrast, when only one value of the two data sets of two channels changes (see A which changes from 3π/4 to 5π/4 in FIG. 24 and C which changes from π/4 to 7π/4 in FIG. 24), there arise comparatively small dips in intensity, which lowers to the neighborhood of an intermediate value between a high level and the low level).

A known technique relevant to the present invention is described in, e.g., Patent Document 1.

(Patent Document 1) JP-A-2001-324732

However, as shown in FIG. 26, in the above-described DQPSK modulator 130, variations in manufacture of the MZM interferometer 136 often induce an imbalance between the intensity of the optical signal phase-modulated by the phase modulator 135-1 (an optical signal component P1 output from the phase modulator 135-1) and the intensity of the optical signal phase-modulated by the phase modulator 135-2 (an optical signal component P2 output from the phase modulator 135-2), both intensities being acquired when the optical signals are merged by the MZM interferometer, (P1≠P2). In this case, despite a phase difference between the symbols of four values assuming a value of π/2 in an ideal state, the phase difference deviates from π/2, to thus give rise to a deviation α. Therefore, there is a problem of the deviation entailing deterioration of signal quality.

Such an imbalance arises between P1 and P2 in a case where the extinction ratio of the modulator 130 is not good. Specifically, the imbalance is caused by a merging ratio of the merging waveguide and a bifurcating ratio of the bifurcating waveguide, both waveguides constituting the MZM interferometer 136, an imbalance between losses of the waveguides, and an imbalance between insertion losses of the Mach-Zehnder waveguide forming the two phase modulators 135-1, 135-2.

FIG. 27 is a graph showing the degree of signal deterioration (Q penalty) in relation to an extinction ratio (ExRp) of the Mach-Zehnder modulator formed from a substrate consisting of lithium niobate. A loss imbalance in an upper domain with reference to the horizontal axis represents reference values for the case where deterioration of the extinction ratio is attributable solely to an imbalance in the losses of the waveguides. As can be seen from FIG. 27, reducing the extent of deterioration of the signal requires a very high extinction ratio.

The technique described in Patent Document 1 set forth is provided for the configuration of an optical switch having an thermo-optic phase shifter which controls the thermo-optic phase shifter so as to provide an extinction ratio corresponding to the temperature of the substrate. However, the technique does not disclose any configuration for making signal quality of the DQPSK modulator excellent in response to an individual difference between extinction ratios due to variations in manufacture of devices.

SUMMARY OF THE INVENTION

The present invention has been conceived in view of the above-described problem and aims at providing a differential quadrature phase shift modulator capable of rendering signal quality superior in accordance with an individual difference of an extinction ratio due to variations in manufacture of a device, as well as providing a method for setting a driving voltage of the differential quadrature phase shift modulator.

To this end, the present invention provides a method for setting a driving voltage of a differential quadrature phase shift modulator which has a first Mach-Zehnder modulator capable of outputting first differential phase-shift modulated signal light by application of a first driving voltage signal forming a differential voltage signal based on first data and a second Mach-Zehnder modulator capable of outputting second differential phase-shift modulated signal light by application of a second driving voltage signal forming a differential voltage signal based on second data, and which outputs differential quadrature phase-shift modulated light by means of merging the first and second signal light, wherein driving voltage signals to be applied to the first and second Mach-Zehnder modulators in the quadrature phase shift modulator are set, the method comprising:

acquiring signal quality of the differential quadrature phase-shift modulated light output from the quadrature phase shift modulator; and adjusting an amplitude of the first or second driving voltage signal in accordance with a monitoring result of signal quality of the differential quadrature phase-shift modulated light.

Moreover, the method may further comprise, after the adjustment of an amplitude of the first or second driving voltage signal, acquiring the signal quality of differential quadrature phase-shift modulated light output from the differential 4-phase-shift modulator, and causing an amplitude difference in amplitudes of differential voltage signals forming the first or second driving voltage signal in accordance with signal quality of the acquired differential quadrature phase-shift modulated light.

More preferably, an eye pattern of the differential quadrature phase-shift modulated light output from the quadrature phase shift modulator may be monitored, and an amplitude of the first or second driving voltage signal may be adjusted, on the basis of a monitoring result, such that variations in a center level of an intensity dip appearing in a range between signals of the differential quadrature phase-shift modulated light become smaller; and, after the adjustment of an amplitude of the first or second driving voltage signal, an eye pattern of differential quadrature phase-shift modulated light output from the quadrature phase shift modulator may be monitored, and a difference may be caused to arise in amplitudes of differential voltage signals forming the first or second driving voltage signal, on the basis of the monitoring result, such that variations in a high level in a signal region of the differential quadrature phase-shift modulated light become smaller.

Further, an error rate may be measured on the basis of demodulated data pertaining to differential quadrature phase-shift modulated light output from the quadrature phase shift modulator, and an amplitude of the first or second driving voltage signal is adjusted on the basis of the error rate determined from a measurement result; and, after the adjustment of the amplitude of the first or second driving voltage signal, an error rate may be measured on the basis of demodulated data pertaining to the differential quadrature phase-shift modulated light output from the quadrature phase shift modulator, and a difference may be caused to arise in amplitudes of differential voltage signals forming the first or second driving voltage signal, on the basis of a measurement result of the error rate.

In this case, the quadrature phase shift modulator may have first and second amplifying sections for amplifying first and second driving voltage signals to be applied to the first and second Mach-Zehnder modulators; an amplitude of the first or second driving voltage signal may be adjusted by controlling gains of respective differential voltage signals forming first and second driving voltage signals to be amplified by the first and second amplifying sections; and a difference may be caused to arise in amplitudes of differential voltage signals forming the first or second driving voltage signal by providing a difference between gains of the respective differential voltage signals forming the first or second driving voltage signal to be amplified by the first or second amplifying section.

In addition, the quadrature phase shift modulator may have first and second attenuation sections which attenuate the first and second driving voltage signals to be applied to the first and second Mach-Zehnder modulators; an amplitude of the first or second driving voltage signal may be adjusted by controlling amounts of attenuation in respective differential voltage signals forming first and second driving voltage signals to be attenuated by the first and second attenuation sections; and a difference may be caused to arise in amplitudes of differential voltage signals forming the first or second driving voltage signal by providing a difference between amounts of attenuation in the respective differential voltage signals forming the first or second driving voltage signals.

In this case, an amplitude of the first or second driving voltage signal may be adjusted by controlling an amplitude of a differential voltage signal forming either the first or second driving voltage signal so as to become smaller than an amplitude of the other driving voltage signal; and a difference may be caused to arise between amplitudes of the differential voltage signals forming one driving voltage signal whose amplitude has been made smaller.

Moreover, the present invention provides a quadrature phase shift modulator comprising:

a wavelength-variable light source;

a first Mach-Zehnder modulator capable of outputting first signal light which is formed by subjecting light output from the wavelength-variable light source to differential phase-shift modulation, by application of a first driving voltage signal forming a pair of differential voltage signals based on first data;

a second Mach-Zehnder modulator capable of outputting second signal light which is formed by subjecting light output from the wavelength-variable light source to differential phase-shift modulation, by application of a second driving voltage signal forming a pair of differential voltage signals based on second data;

a phase-shift section for imparting a phase difference of $\pi/2$ between first and second signal light output from the first and second Mach-Zehnder modulators;

a merging section which merges the first and second signal light imparted with the phase difference of $\pi/2$ by the phase-shift section, to thus output differential quadrature phase-shift modulated light;

a storage section for storing voltage amplitude information about the first and second driving voltage signals to be applied to the first, second Mach-Zehnder modulators, the information complying with settings of a wavelength of light output from the wavelength-variable light source; and a driving voltage amplitude control section which controls voltage amplitudes of the first and second driving voltage signals to be applied to the first and second Mach-Zehnder modulators by reference to the storage section, in accordance with the settings of the wavelength of the light output from the wavelength-variable light source.

Further, the driving voltage amplitude control section can be provided with first and second amplifying sections for amplifying first and second driving voltage signals to be applied to the first and second Mach-Zehnder modulators; and a gain control section for controlling gains of the first and second amplifying sections by reference to contents of the storage section such that driving voltage amplitudes of the first and second driving voltage signals match the settings of the wavelength.

In addition, the driving voltage amplitude control section can be provided with first and second attenuation sections for attenuating first and second driving voltage signals to be applied to the first and second Mach-Zehnder modulators; and an attenuation control section for controlling amounts of attenuation in the first and second attenuation sections by reference to contents of the storage section such that driving voltage amplitudes of the first and second driving voltage signals match the settings of the wavelength.

Furthermore, by reference to the storage section, the driving voltage amplitude control section can control voltage amplitudes of the first and second driving voltage signals such that a difference arises between amplitudes of a pair of differential voltage signals forming a driving voltage signal applied to at least one of the first and second Mach-Zehnder modulators in accordance with the wavelength settings.

In this case, the first amplifying section preferably has first and second amplifiers for amplifying a pair of differential voltage signals forming the first driving voltage signal; the second amplifying section preferably has third and fourth amplifiers which amplify a pair of differential voltage signals forming the second driving voltage signal; and the gain control section preferably causes a difference in gain settings of the first and second amplifiers or gain settings of the third and fourth amplifiers.

Alternatively, the first attenuation section has first and second attenuators for attenuating a pair of differential voltage signals forming the first driving voltage signal;

the second attenuation section has third and fourth attenuators which attenuate a pair of differential voltage signals forming the second driving voltage signal; and the attenuation control section causes a difference in settings pertaining to amounts of attenuation in the first and second attenuators or settings pertaining to amounts of attenuation in the third and fourth attenuators, according to the wavelength settings.

More preferably, the storage section can store voltage amplitude information about the first and second driving voltage signals complying with the set wavelength, in order to arrange points of four phase signals in differential quadrature phase-shift modulated light output from the merging section so as to become substantially equidistant from a point of origin and to assume phase relationships of $\pi/4$, $3\pi/4$, $5\pi/4$, and $7\pi/4$.

As mentioned above, according to the present invention, the amplitude of the first or second driving voltage signal can be adjusted. Accordingly, there is yielded an advantage of the ability to enhance the quality of DQPSK modulated light in accordance with the individual difference in extinction ratio due to variations in manufacture of devices; to suppress deterioration of the extinction ratio of the DQPSK modulator; and to attain improved yield and cost-reduction of the optical transmitter.

The driving voltage amplitude control section also yields an advantage of the ability to enhance the quality of DQPSK modulated light in accordance with the individual difference in the extinction ratio due to variations in manufacture of devices according to the wavelength output from a wavelength-variable light source; to suppress deterioration of the extinction ratio of the DQPSK modulator; and to attain improved yield and cost-reduction of the optical transmitter. Moreover, when the DQPSK modulator of the present invention is applied to a wavelength-multiplexed optical communication system, the modulator contributes to cost-reduction of equipment compatible with respective wavelength channels, thereby enabling significant reductions in the cost of manufacture of an optical transmitter.

BRIEF DESCRIPTION OF THE DRAWINGS

FIG. 3 is a flowchart for describing the operation for setting the amplitude of the driving voltage signal according to the first embodiment of the present invention;

FIGS. 4(A) to 4(C) are views showing an eye pattern of DQPSK modulated light achieved when the amplitude of the driving voltage signal according to the first embodiment of the present invention is set;

DESCRIPTION OF THE PREFERRED EMBODIMENTS

Embodiments of the present invention will be described hereinbelow by reference to the drawings.

In addition to the above-described objects of the present invention, another technical problem, means for resolving the technical problem, and working-effects of the means also become evident as a result of disclosure of the embodiments provided below.

[A1] Description of a First Embodiment

Figure 1:
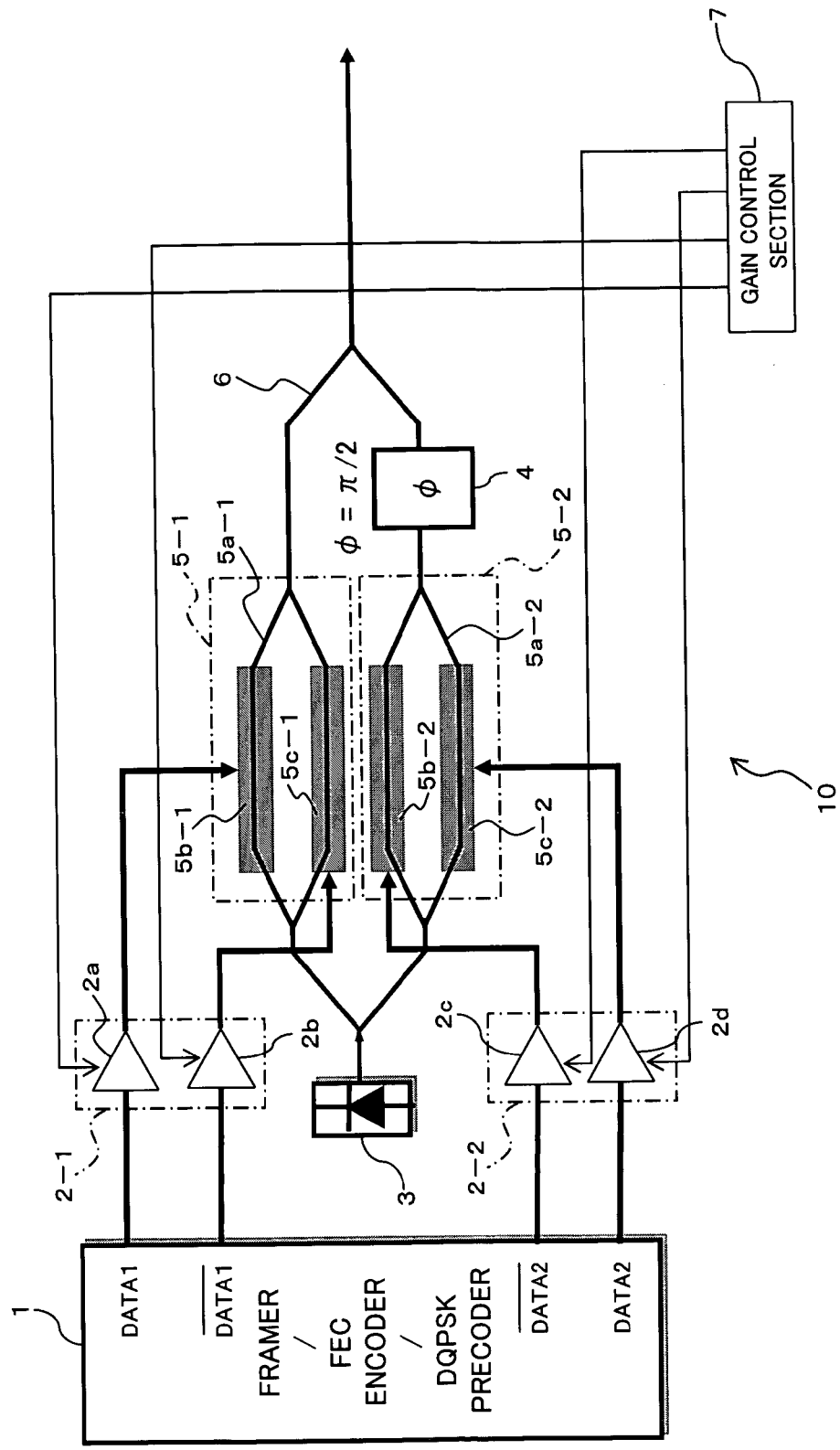
FIG. 1 is a view showing application of a differential quadrature phase-shift-keying modulator (DQPSK modulator) to a first embodiment of the present invention.

FIG. 1 is a view showing a differential quadrature phase-shift-keying modulator (DQPSK modulator) 10 applied to a first embodiment of the present invention. The DQPSK modulator 10 shown in FIG. 1 has a transmission data processing section 1, amplifying sections 2-1 and 2-2, a CW (Continuous Wave) light source 3, a $\pi/2$ phase modulator 4, two Mach-Zehnder phase modulators 5-1 and 5-2, an MZM interferometer 6, and a gain control section 7 for controlling gains of the amplifying sections 2-1, 2-2, all of these elements being basically similar to those (reference numerals 131 to 136) shown in FIG. 23 described previously.

Figure 23:
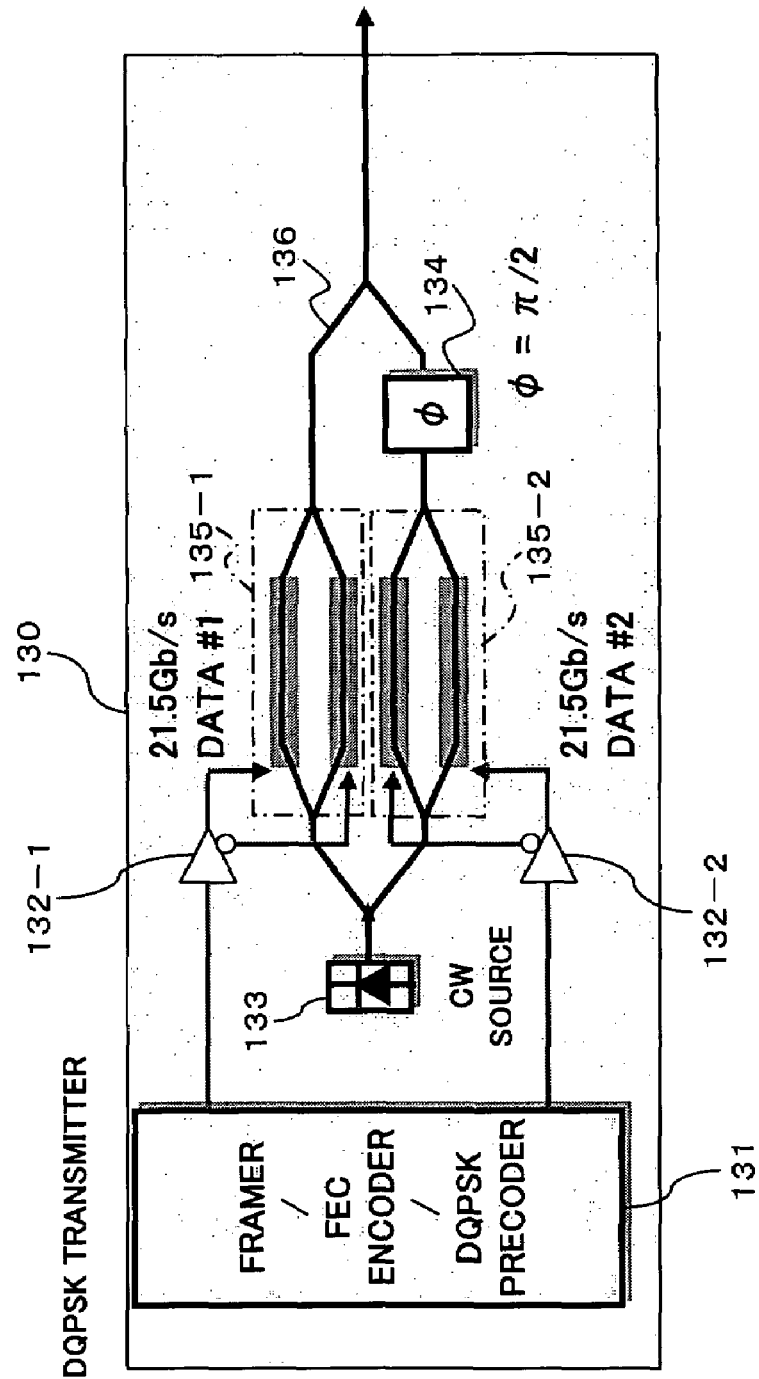
FIG. 23 is a view showing the configuration of a common DQPSK modulator.
Figure 24:
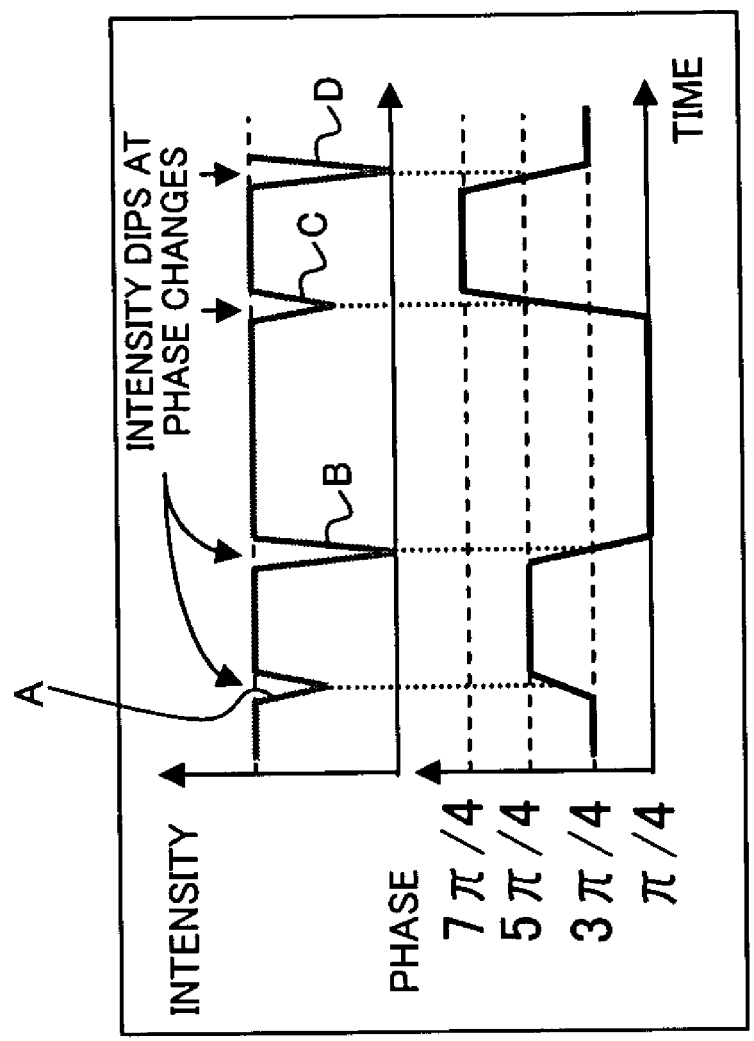
FIGS. 24 and 25 are views for describing the operation of the DQPSK modulator shown in FIG. 23.

Like that (see reference numeral 131) shown in FIG. 23, the transmission data processing section 1 has the function of a DQPSK precoder for effecting encoding in which is reflected information about a difference between the code of current data and the code of data preceding the current data by one bit, as well as having the function of a framer and that of an FEC encoder. This transmission data processing section 1 outputs a pair of differential voltage signals based on first data (Data #1 and an inverted signal of Data #1) and a pair of differential voltage signals based on second data (Data #2 and an inverted signal of Data #2).

The amplifying section 2-1 is for amplifying the pair of differential voltage signals on the basis of the first data output from the transmission data processing section 1, to thus output the amplified signals as driving voltage signals for the phase modulator 5-1. The amplifying section 2-1 has an amplifier (a first amplifier) 2a for amplifying Data #1, which is one of the differential voltage signals, and an amplifier (a second amplifier) 2b for amplifying the inverted signal of Data #1, which is the remaining signal of the differential voltage signals.

Similarly, the amplifying section 2-2 amplifies a pair of differential voltage signals on the basis of the second data output from the transmission data processing section 1, to thus output the amplified signals as driving voltage signals for the phase modulator 5-2. The amplifying section 2-2 has an amplifier (a third amplifier) 2c for amplifying Data #2, which is one of the differential voltage signals, and an amplifier (a fourth amplifier) 2d for amplifying the inverted signal of Data #2, which is the remaining signal of the differential voltage signals.

Put another way, the previously-described amplifying sections 2-1, 2-2 act as drivers for driving the phase modulators 5-1, 5-2 on the basis of differential signals based on the first and second data output from the transmission data processing section 1.

For example, SHF 100 APP manufactured by SHF Communication Technologies AG can be used for the amplifiers 2a to 2d.

Figure 21:
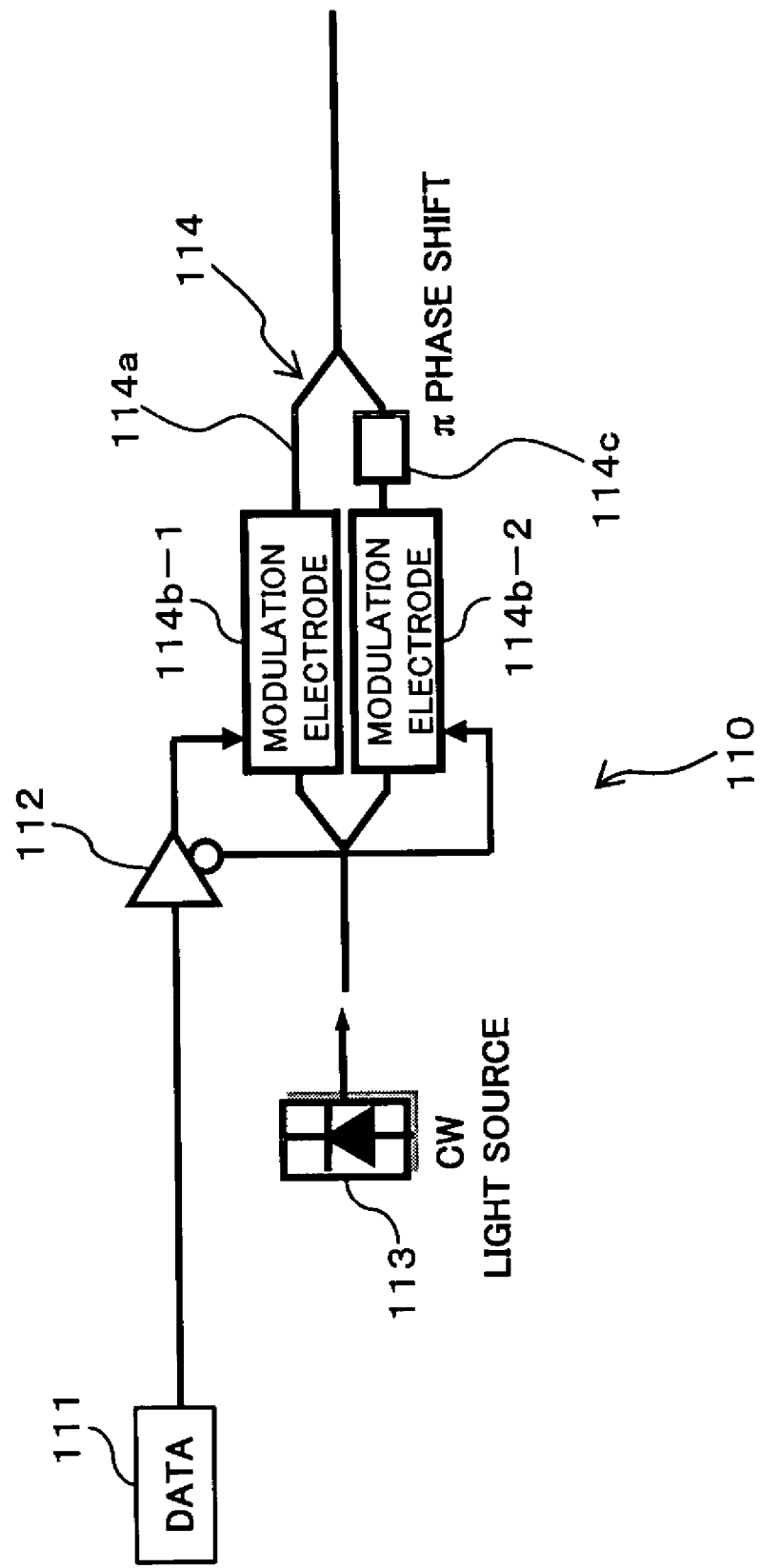
FIG. 21 is a view showing the configuration of a common BPSK modulator.
Figure 22:
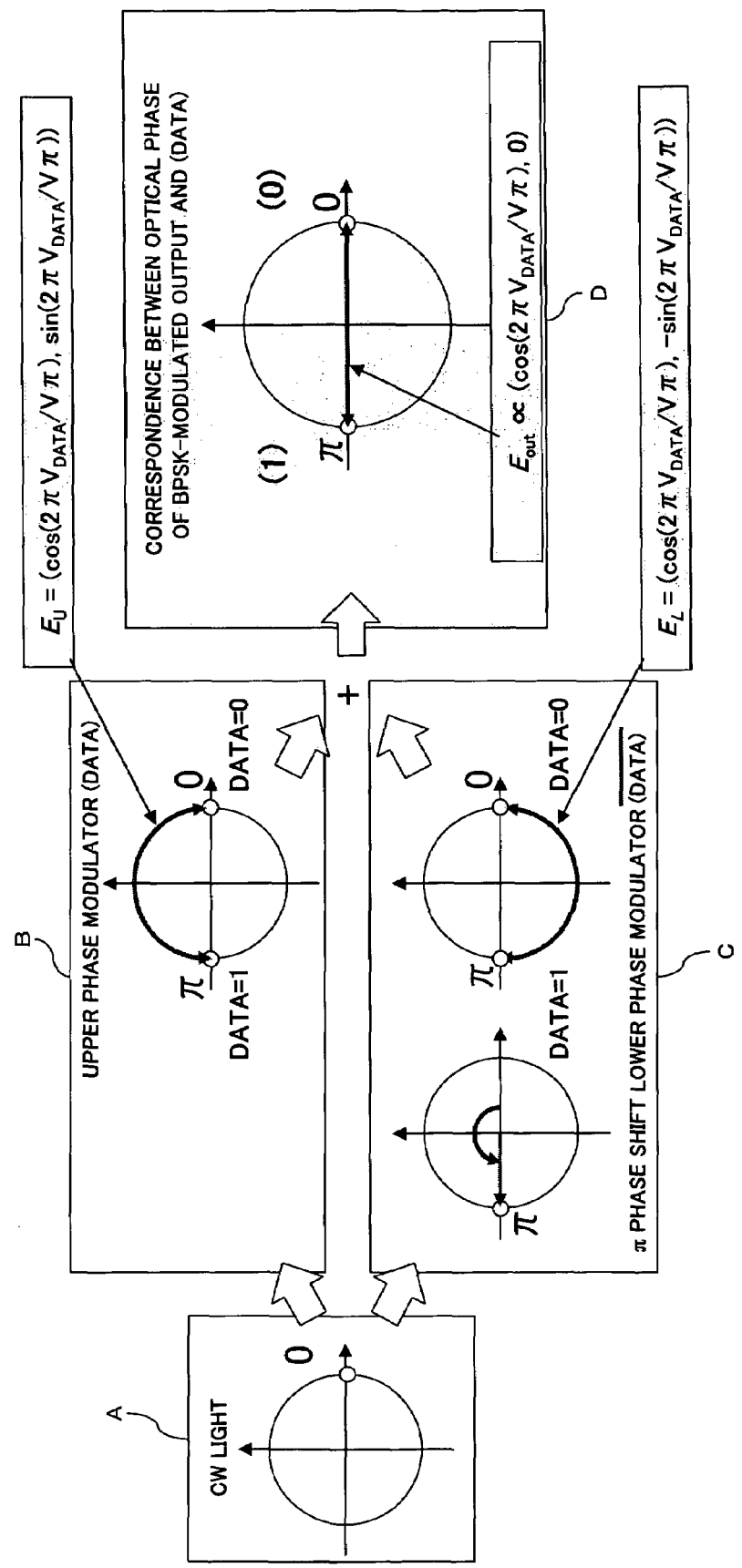
FIG. 22 is a view for describing the operation of the BPSK modulator shown in FIG. 21.

Each of the phase modulators 5-1, 5-2 has a configuration analogous to that of the phase modulator 110 shown in FIG. 21 that has been described previously. The phase modulator 5-1 is a first Mach-Zehnder modulator capable of outputting a first differential phase-shift-keying (BPSK) modulated signal light by applying, from the transmission data processing section 1 to the amplifying section 2-1, the first driving voltage signal forming a differential voltage signal based on the first data. This phase modulator 5-1 also has a Mach-Zehnder waveguide 5a-1, electrodes 5b-1, 5c-1, and an unillustrated π-phase shift section.

Specifically, differential electrical signals output from the amplifiers 2a, 2b are applied to the electrodes 5b-1, 5c-1 provided on respective bifurcated waveguides of the Mach-Zehnder waveguide 5a-1 forming the phase modulator 5-1, so that BPSK modulated light (first signal light)—which has phase 0 and phase π respectively assigned "0" and "1" which form the first data—can be output.

Similarly, the phase modulator 5-2 is a second Mach-Zehnder modulator capable of outputting second differential phase-shift-keying modulated signal light by application of a second driving voltage signal forming a differential voltage signal based on second data. This phase modulator 5-2 also has a Mach-Zehnder waveguide 5a-2, electrodes 5b-2, 5c-2, and an unillustrated π phase shift section.

Differential electrical signals output from the amplifiers 2c, 2d are applied to the electrodes 5b-2, 5c-2 provided on respective bifurcated waveguides of the Mach-Zehnder waveguide 5a-2 forming the phase modulator 5-2, so that BPSK modulated light—which has phase 0 and phase π, respectively assigned "0" and "1" which form second data—can be output. In FIG. 1, a π phase shift section (see reference numeral 114c in FIG. 21) provided in a stage subsequent to the electrodes 5c-1, 5c-2 is omitted from the drawing.

Figure 25:
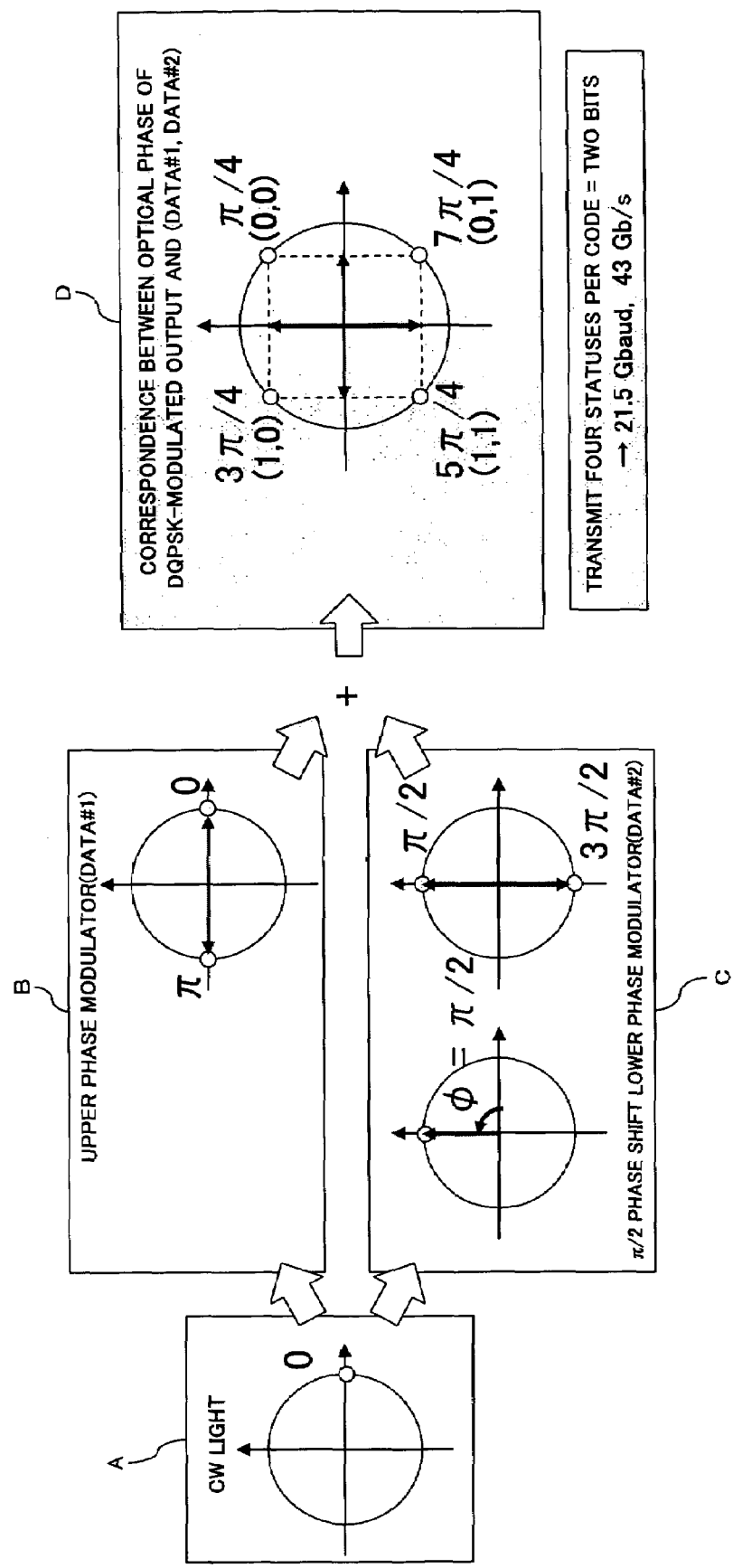

The π/2 phase shifter 4 shifts, by π/2, the phase of the second signal light phase-modulated by the phase modulator 5-2. The MZM interferometer 6 can merge the outputs (the first and second signal light beams) from the phase modulators 5-1 and 5-2—the outputs having been phase-shifted by π/2 by the π/2 phase shifter 4—and can output the merged light as DQPSK modulated light (see FIG. 25). Accordingly, even in the DQPSK modulator 10 shown in FIG. 1, the MZM interferometer 6 is configured as a master MZ waveguide, and the Mach-Zehnder waveguides 5a-1, 5a-2 forming the phase modulators 5-1, 5-2 are configured as slave MZ waveguides.

In the DQPSK modulator 10 of the first embodiment, imbalance is created between the average amplitudes (driving amplitudes of drivers) of the driving voltage signals of the two phase modulators 5-1 and 5-2, by means of lowering any one of the average amplitudes below an optimal value through gain control operation of the gain control section 7. Further, imbalance is created in the differential driving amplitudes of the phase modulator 5-1 or 5-2 whose average amplitude has been lowered. Thereby, there can be mitigated deterioration of signal quality, which is caused by degradation in the extinction ratio corresponding to individual differences in extinction ratios owing to variations in manufacture of devices.

Figure 2:
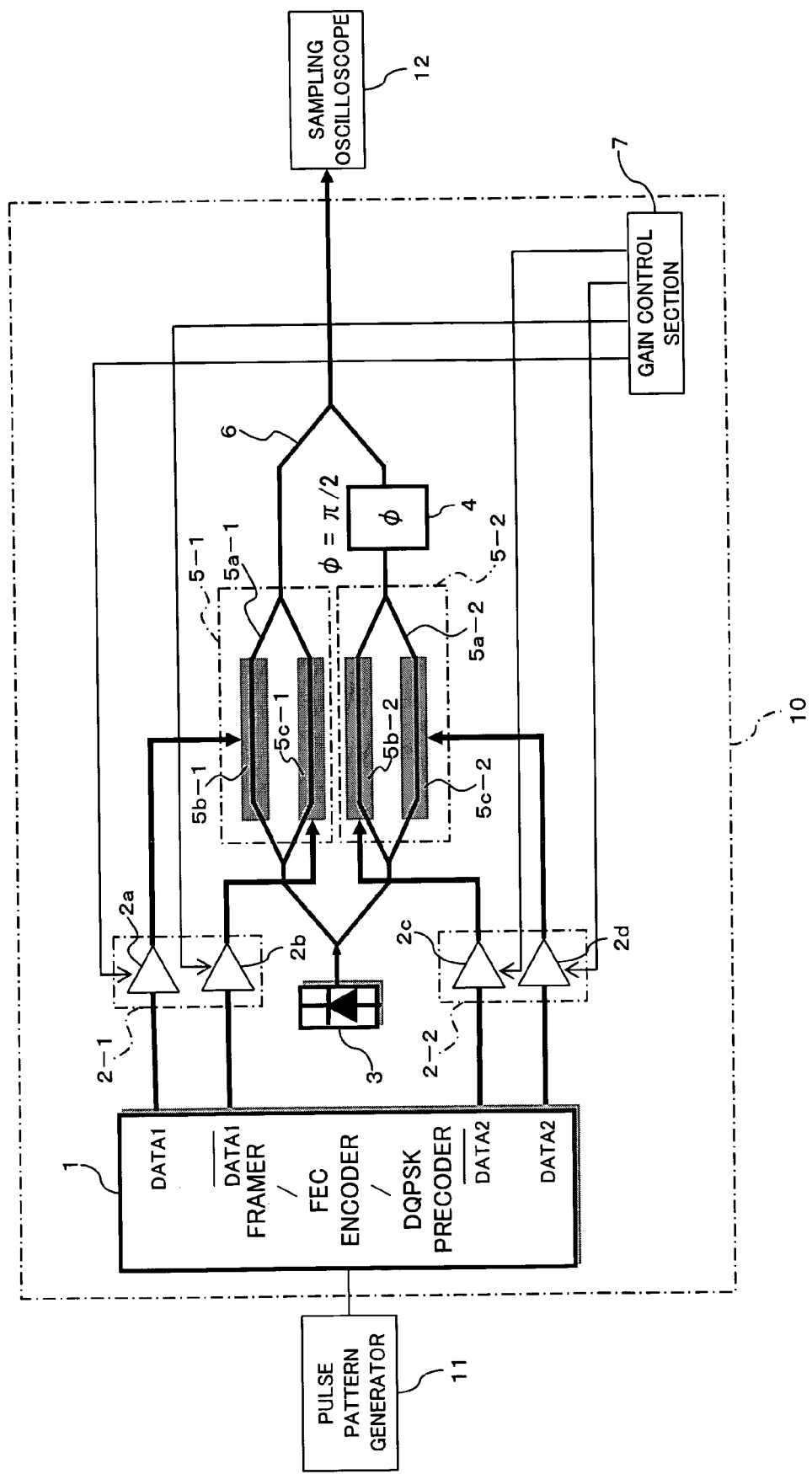
FIG. 2 is a view showing a configuration for setting the amplitude of a driving voltage signal according to a first embodiment of the present invention.

Here, settings for reducing the average amplitudes of the above-described driving voltage signals and settings for creating imbalance between the differential driving amplitudes of the phase modulator 5-1 or 5-2—whose average amplitude has been lowered—can be effected by the gain control section 7 through use of the configuration shown in, e.g., FIG. 2, especially before operation for manufacturing an apparatus is started.

Specifically, as shown in FIG. 2, in order to cause the gain control section 7 to set gains of the amplifying sections 2-1, 2-2, a pulse pattern generator 11 capable of generating a data sequence (e.g., 40 Gb/s) for testing purpose is connected to the transmission data processing section 1 forming the DQPSK modulator 10. In addition, a sampling oscilloscope 12 for monitoring an eye pattern of the DQPSK modulated light output from the DQPSK modulator 10 is connected to the output terminal of the MZM interferometer 6.

Here, in the DQPSK modulator 10, the transmission data processing section 1 outputs, from the data sequence generated by the pulse pattern generator 11, differential voltage signals (Data #1, the inverted signal of Data #1, Data #2, and the inverted signal of Data #2) based on data of two channels for testing purposes. A driving electrical signal is supplied to the phase modulators 5-1, 5-2 by way of the amplifying sections 2-1, 2-2 serving as drivers.

In the phase modulators 5-1, 5-2, the continuous light output from the CW light source 3 is phase-modulated on the basis of the driving voltage signals from the amplifying sections 2-1, 2-2, thereby outputting the phase-modulated light as BPSK modulated light. The MZM interferometer 6 merges the BPSK modulated light from the phase modulator 5-1 and the light, from the phase modulator 5-2, whose phase has been shifted from the BPSK modulated light by π/2, and outputs the thus-merged light as DQPSK modulated light.

On the premise that the extinction ratio of the MZM interferometer 6 is ∞, gains of the amplifying sections 2-1, 2-2 are set, through initial settings of the gain control section 7, such that the driving voltage signals supplied to the phase modulators 5-1, 5-2 assume ideal values.

The sampling oscilloscope 12 monitors an eye pattern of the DQPSK modulated light output from the MZM interferometer 6 of the DQPSK modulator 10, whereby gains of the amplifying sections 2-1, 2-2 can be set and controlled by the gain control section 7 as indicated by a flowchart shown in FIG. 3.

The eye pattern of the DQPSK modulated light output from the DQPSK modulator 10 is monitored by the sampling oscilloscope 12 (step A1). From the result of monitoring operation, the average amplitude of the first or second driving voltage signal is adjusted by the settings pertaining to gains of the amplifiers 2a, 2b (or 2c, 2d) of the gain control section 7 such that variations in the center level of the intensity dip appearing in a region between the signals of DQPSK modulated light (a region between symbols) become smaller (step A2).

Specifically, the average amplitude of the differential voltage signals forming either the first or second driving voltage signal is controlled so as to become smaller than the average amplitude of the remaining driving voltage signal. Adjustment is performed such that the gain of the amplifying section which amplifies the driving voltage signal whose average amplitude has been adjusted becomes smaller than the gain corresponding to an ideal value.

Next, after the average amplitude of the first or second driving voltage signal has been adjusted, the eye pattern of the DQPSK modulated light output from the DQPSK modulator 10 is monitored by the sampling oscilloscope 12 (step A3). From the result of monitoring operation, an amplitude difference is created between the differential voltage signals forming the first or second driving voltage signal such that variations in the high level in the signal region (symbol region) of the DQPSK modulated light become smaller (step A4).

In order to reduce variations in a high level in a signal region of the DQPSK modulated light, an amplitude difference is created between the differential voltages forming the driving voltage signal whose average amplitude has been reduced. In this case, by way of the gain control section 7, a difference is created between gains of the amplifiers (2a, 2b) forming the amplifying section (e.g., the amplifying section 2-1) which feeds the driving voltage signal whose average amplitude has been reduced, thereby creating the above-described amplitude difference.

Here, an explanation is given of improving deterioration of signal quality due to the extinction ratio of the MZM interferometer 6 by means of adjusting the average amplitude of the driving voltage signal as mentioned above. When the extinction ratio of the MZM interferometer 6 is not excellent, variations arise in the dip of light intensity arising when the value of data of two channels change (specifically from "0" to "1" or from "1" to "0"). Specifically, when the extinction ratio of the MZM interferometer 6 is not excellent and when the power of the modulated light P1, P2 of two channels included in the DQPSK modulated light, such as those shown in FIG. 26 mentioned previously, assumes a relationship of P1<P2, the dip changes between when data pertaining solely to P1 change and when data pertaining solely to P2 change, in a case where only one of values of data of two channels changes.

For example, a change (the depth of the dip) achieved when the data pertaining solely to P1 change from "0" to "1" (from $\pi/4$ to $3\pi/4$) becomes smaller than a change (the depth of the dip) achieved when the data pertaining solely to P2 change from "0" to "1" (from $\pi/4$ to $7\pi/4$).

When the extinction ratio of the MZM interferometer 6 is excellent, the power of the BPSK modulated light P1 and the power of the BPSK modulated light P2, both of which are of two channels, are essentially equal to each other (P1=P2). When any one of the values of the data of two channels changes, an intensity dip, in which intensity lowers to the neighborhood of an intermediate value of a high level and a low level, arises without regard to which data sequence corresponds to the data sequence whose value changes. Meanwhile, when the extinction ratio of the MZM interferometer 6 is not excellent, the power of the modulated light P1 and that of the modulated light P2, both of which belong to the above-described two channels, differ from each other. Accordingly, as shown in A1 in FIG. 4A, when any one of the values of the data of the two channels changes, variations are caused to arise in the dip by the data sequence in which the value of the data has changed.

Now, in order to eliminate the variations A1 in the intensity dip on the basis of the variations in the intensity dip of the sampling oscilloscope 12, the gain control section 7 performs setting and control such that the gains of the amplifying section 2-1 or 2-2 are reduced, to thus adjust the average amplitude of the first or second driving voltage signal for the phase modulator 5-1 or 5-2. Put another way, the average amplitude of the differential voltage signal forming either the first or second driving voltage signal is controlled so as to become smaller than the average amplitude of the remaining driving voltage signal.

As mentioned above, the average amplitude of the differential voltage signal forming either the first or second driving voltage signal is controlled so as to become smaller than the average amplitude of the other driving voltage signal such that the variations A1 in the intensity dip monitored by the sampling oscilloscope 12 are eliminated. Thus, the power of the modulated light P1 and that of the modulated light P2, both of which are of two channels, can be made essentially equal to each other, thereby suppressing deterioration of signal quality attributable to the extinction ratio of the MZM interferometer 6.

Figure 6:
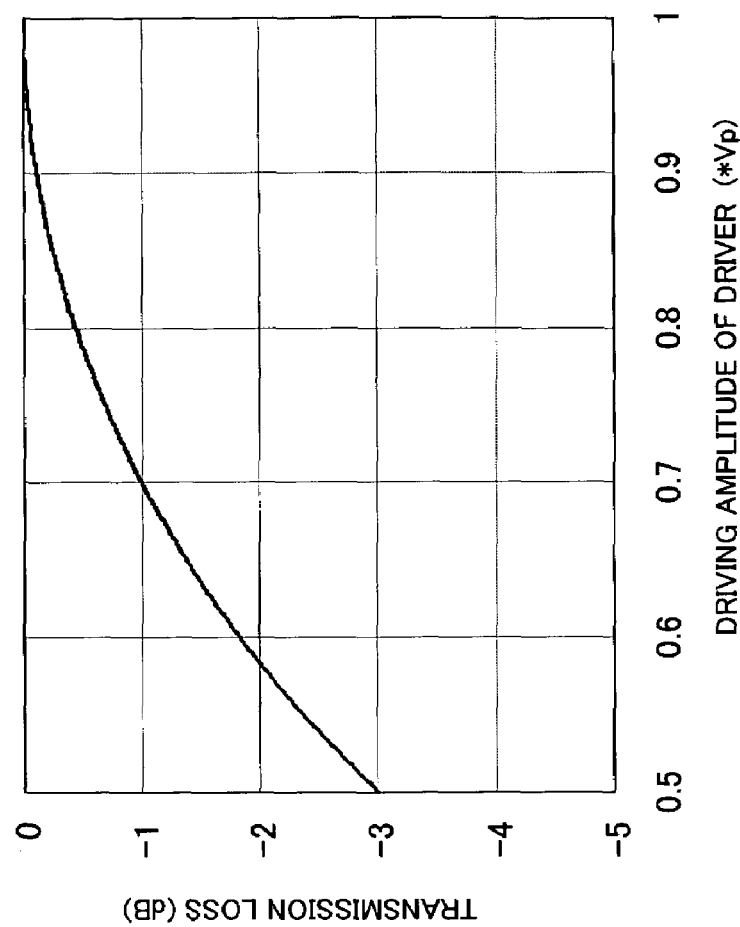

FIG. 6 is a graph showing variations in transmission losses of the Mach-Zehnder phase modulators 5-1, 5-2 with respect to the driving amplitude of the driver. As shown in FIG. 6, the Mach-Zehnder phase modulators 5-1, 5-2 can change the transmission losses by means of rendering the amplitudes of the driving voltage signals from the amplifying sections 2-1, 2-2 smaller than ideal values.

Figure 5:
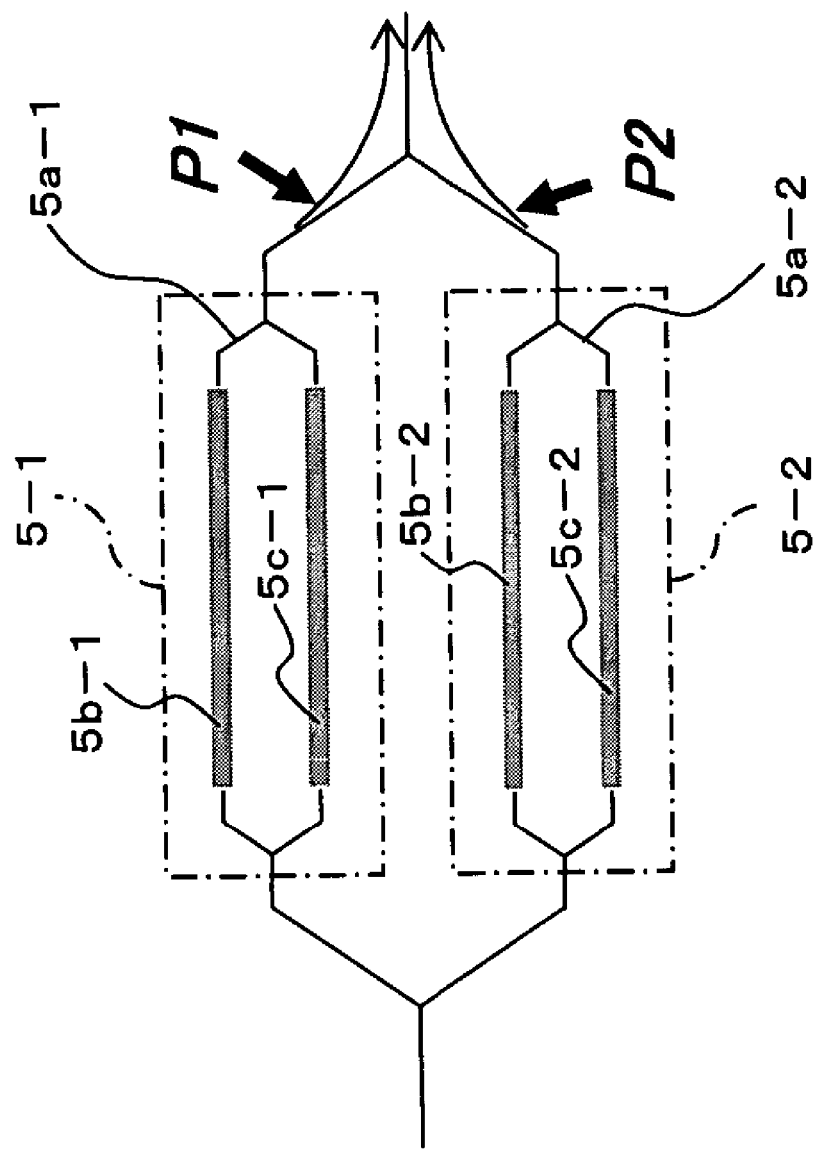
FIGS. 5 and 6 are views for describing the operation for setting the amplitude of the driving voltage signal according to the first embodiment of the present invention.

The driving voltage signals output from the amplifying sections 2-1, 2-2 are ideally a pair of differential voltage signals which have the same average amplitude value and are inverted in relation to each other. For example, as shown in FIG. 5, when a relationship of P1>P2 exists, because of a manufacturing error such as a waveguide loss, between the optical output intensity levels P1, P2 of the two slave MZ waveguides 5a-1, 5a-2, the transmission loss is increased by making the average amplitude of the driving voltage signal of the phase modulator 5-1 smaller than an optimal value, to thus perform adjustment so as to assume a relationship of P1=P2. The optimal value of the average amplitude is an average amplitude of the driving voltage at which the optical intensity can be maximized while the phase 0 rad and the phase $\pi$ rad to the data sets are assigned to data "0" and "1."

Figure 26:
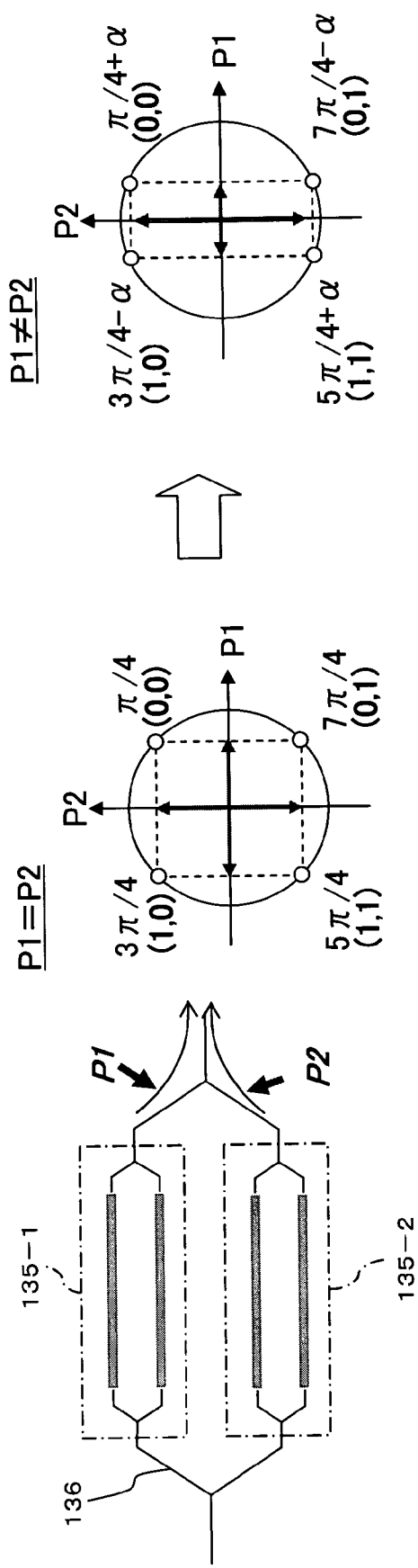
FIG. 26 is a view for describing a problem to be solved by the present invention.
Figure 27:
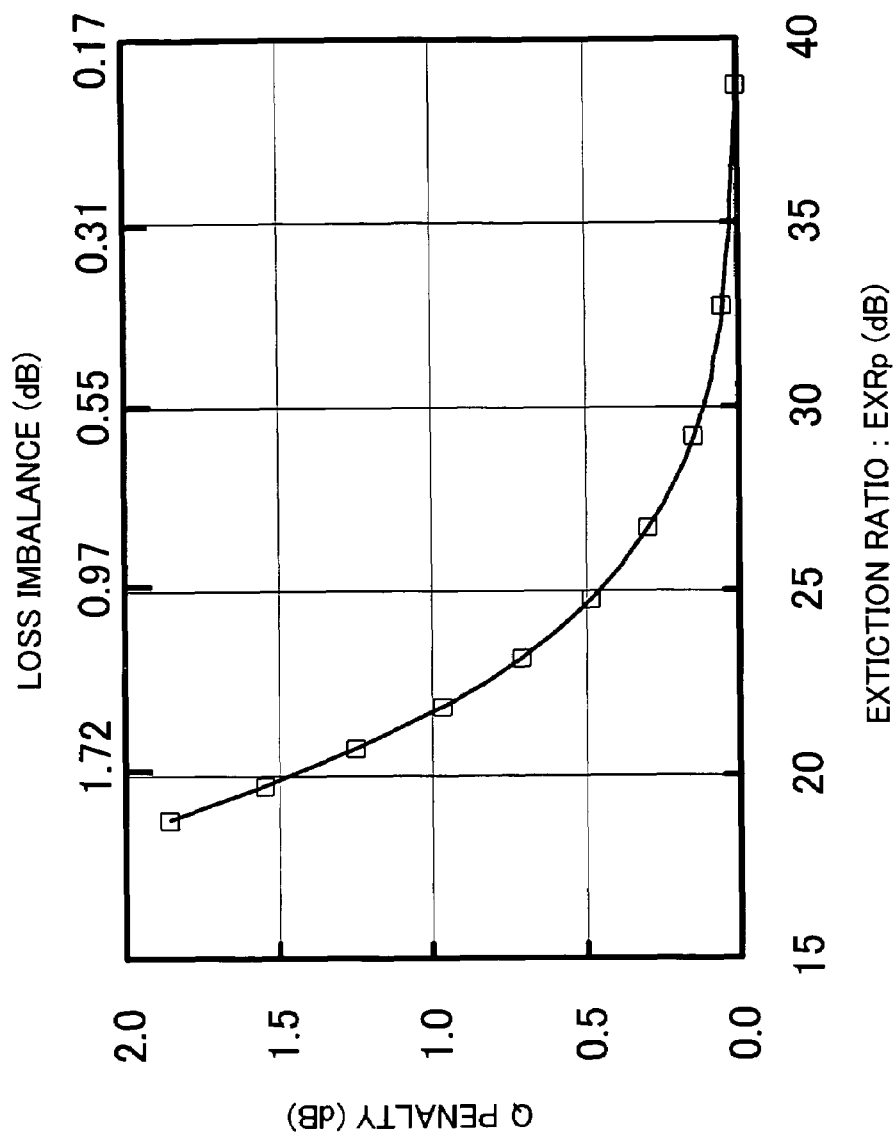
FIG. 27 is a graph showing a level of deterioration of a signal with respect to an extinction ratio of a Mach-Zehnder modulator formed on a substrate made of lithium niobate.

As shown in FIG. 26, which has been described previously, when there exists a relationship of P1<P2, the value of the driving voltage amplitude for the phase modulator 5-2 is made smaller than the optimal value, whereby a symbol achieved when P1 and P2 are merged together can be adjusted to $\pi/4$, $3\pi/4$, $5\pi/4$, and $7\pi/4$, which are ideal phase points.

Next, the reason (step A4 in FIG. 3) for creating a difference between amplitudes of the differential voltage signals forming the driving voltage signal whose average amplitude has been made smaller will be described.

Figure 7:
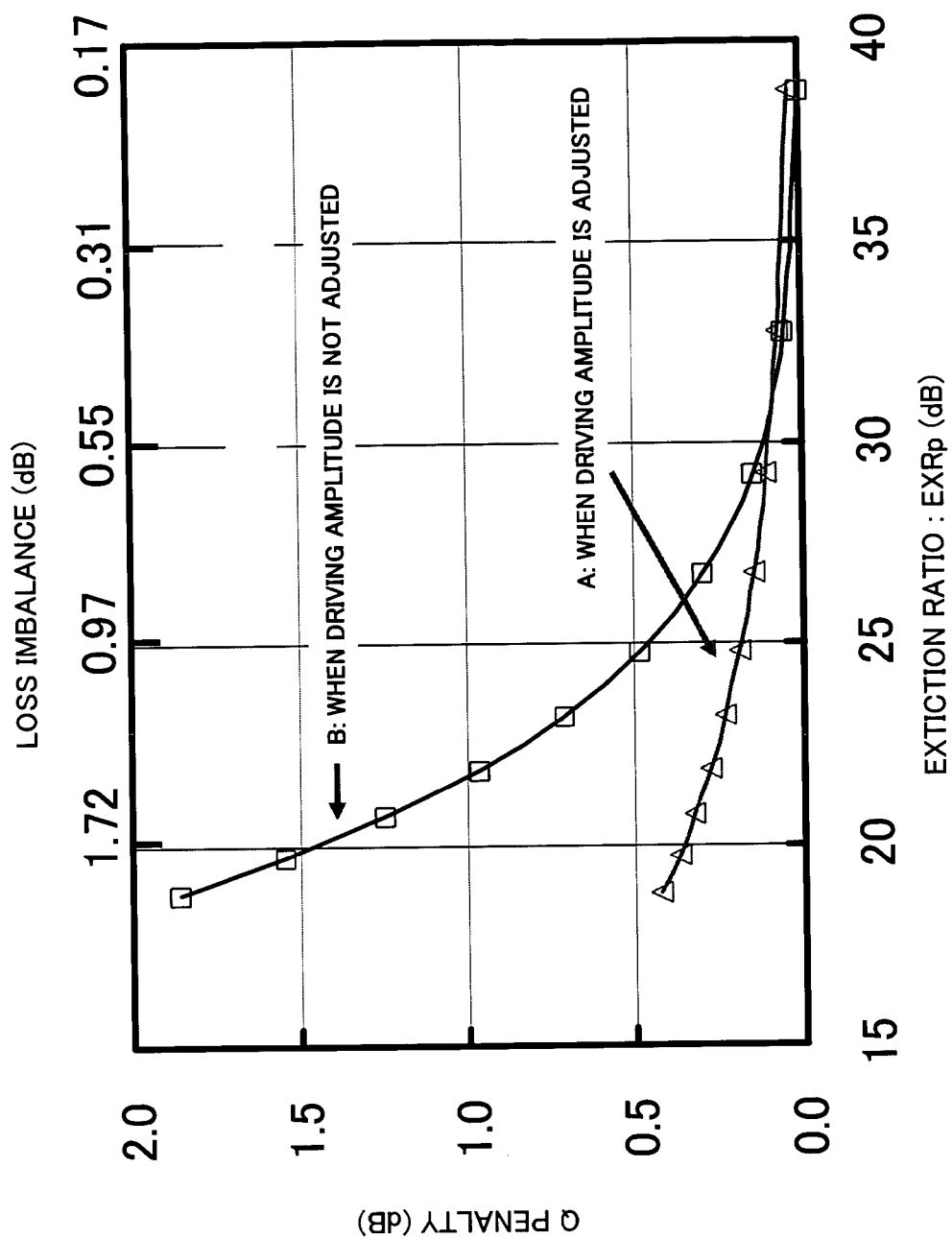
FIGS. 7 to 15 are respective views for describing a working-effect achieved by setting the amplitude of the driving voltage signal according to the first embodiment of the present invention.

FIG. 7 shows an example comparison between the amount of deterioration of a waveform achieved when the average amplitude of the driving voltage signal of one of the phase modulators 5-1, 5-2 is adjusted so as to be smaller (than an optimal value) (A) and the amount of deterioration of a waveform achieved when the average amplitude is not adjusted (B). When the cases A and B, both being shown in FIG. 7, are compared with each other, an improvement effect of about 1 dB in Q value is understood to be achieved in the case of an extinction ratio of 20 dB. However, as can be seen from FIG. 7, when the extinction ratio of the signal light output from the MZM interferometer 6 has a characteristic on the order of about 20 dB because of errors in manufacture of devices, deterioration of signal quality is comparatively large even when the driving amplitude of the driver is adjusted.

Figure 8:
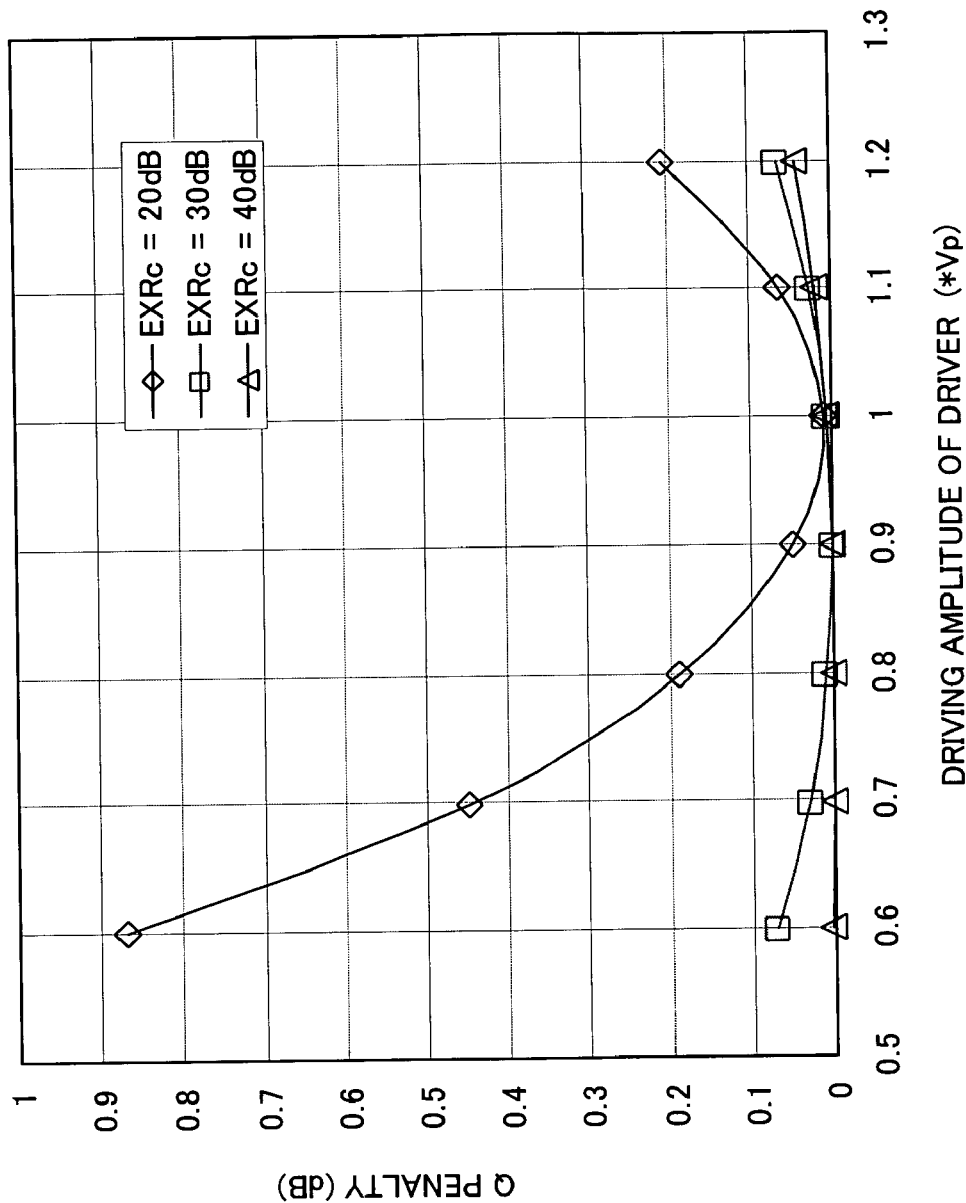

The reason for this is that signal quality is deteriorated as a result of a decrease in the average amplitude of the driving voltage signal (the driving amplitude of the driver). FIG. 8 shows a result of comparison between the driving amplitude of the driver and the amount of deterioration of a waveform for each extinction ratio of the single phase modulator 5-1 (or 5-2). As shown in FIG. 8, it is understood that signal quality is deteriorated by controllably attenuating the driving amplitude as an extinction ratio EXRc of the slave MZ waveguide 5a-1 (5a-2) forming the phase modulator 5-1 (5-2) is deteriorated from 40 dB to 30 dB and further to 20 dB.

The reason for this will now be described by reference to FIG. 9. When phase modulation is performed by means of the phase modulators 5-1 and 5-2, the phase of the output light changes to 0 or $\pi$ in an ideal state. However, in a case where the extinction ratio of, e.g., the phase modulator 5-1, is not good (P'1≠P'2), the phase shifts from 0 or $\pi$ when the driving amplitude is attenuated (see A in FIG. 9).

P'1 designates optical power achieved when the light modulated by the electrode 5b-1 forming the phase modulator 5-1 is merged by the merging waveguide of the slave MZ waveguide 5a. P'2 designates optical power achieved when the light that has been modulated by the electrode 5c-1 forming the phase modulator 5-1 and has undergone $\pi$ phase shift is merged by the merging waveguide of the slave MZ waveguide 5a.

In this case, even when the phase shift has not arisen in the second signal light from the phase modulator 5-2 (see B in FIG. 9), a shift arises in phase differences of symbols of four values pertaining to the signal light merged by the MZM interferometer 6, and a shift also arises in intensity levels of the respective symbols (see C in FIG. 9), to thus deteriorate signal quality.

Figure 10:
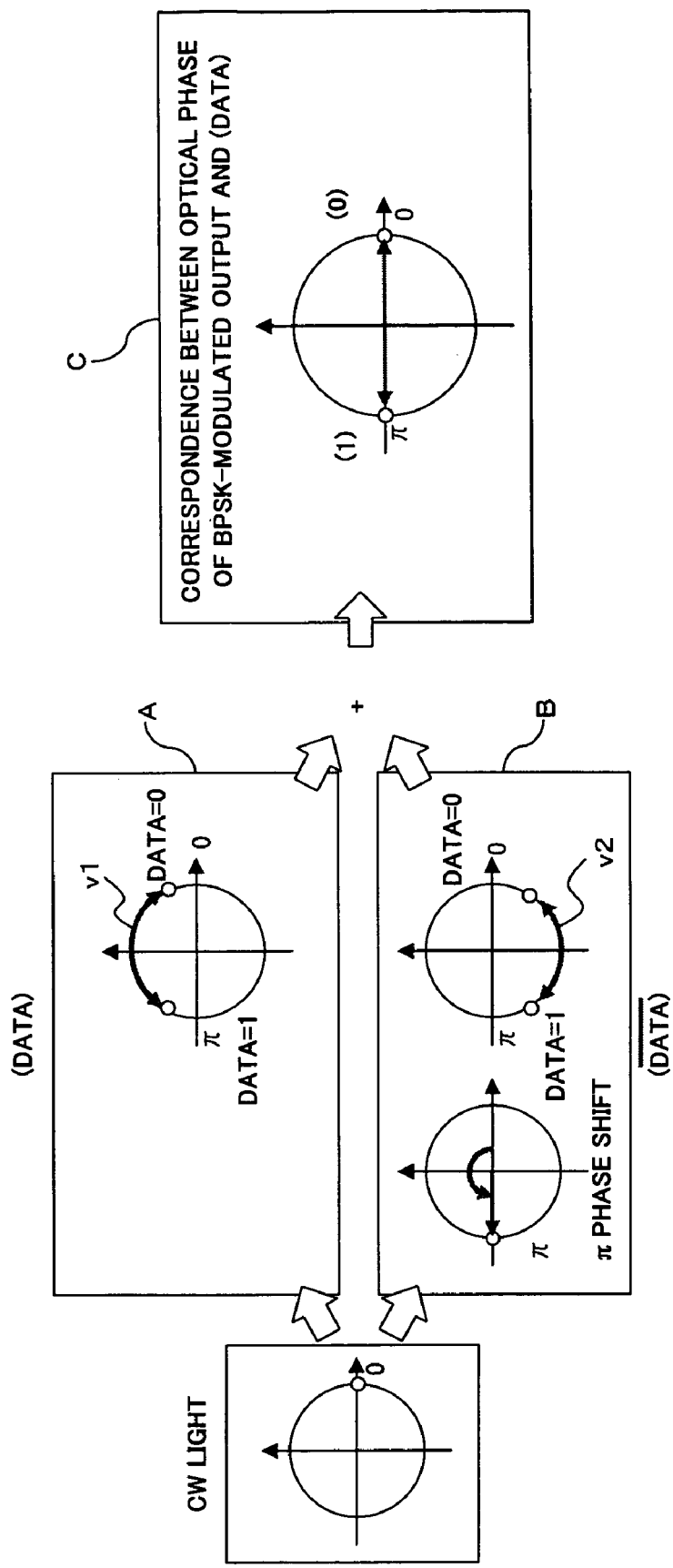
Figure 11:
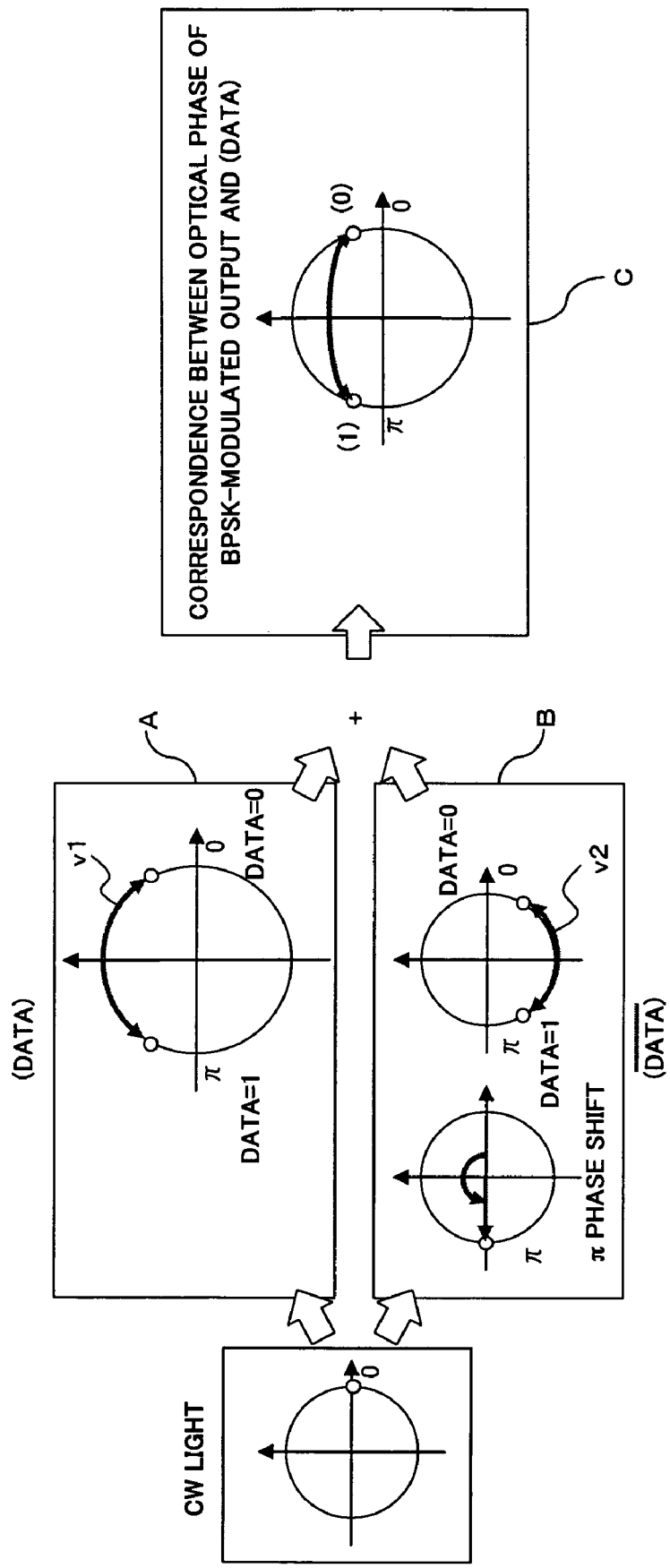

FIGS. 10 and 11 are views for describing the phase deviating from 0 or $\pi$ when the average amplitude of the driving voltage signal is attenuated by the phase modulator 5-1 (or 5-2) whose extinction ratio is not excellent (P'1≠P'2), in contrast with a case where the extinction ratio is excellent. FIG. 10 shows a relationship between the driving voltage signal of the phase modulator 5-1 whose extinction ratio is excellent and the BPSK modulated light serving as output light. FIG. 11 shows a relationship between a driving voltage signal output from the phase modulator 5-1 whose extinction ratio is not excellent and the BPSK modulated light serving as output light.

In FIGS. 10 and 11, A denotes a correspondence between phases and the data sets "0" and "1" pertaining to the light that is phase-modulated by application of a driving voltage to the electrode 5b-1; and B denotes a correspondence between phases and the data sets "0" and "1" pertaining to the light that is phase-modulated by application of a driving voltage to the electrode 5c-1. The radii of the circles in the phase planes in A and B show optical power of the continuous light propagating through the bifurcated waveguide in which the electrodes 5b-1, 5c-1 are formed.

In the case shown in FIG. 10 where the extinction ratio is excellent, optical power components of the DQPSK modulated light output from the MZM interferometer 6, the components being achieved at the respective waveguides, become essentially equal to each other. Hence, the radii of the circles showing the power components are illustrated so as to become essentially equal to each other in A and B shown in FIG. 10. Consequently, even when the average amplitude of the driving voltage signal has been reduced, driving voltages v1 and v2—whose phases are inverted from each other and which have the same amplitude—are imparted to the electrodes 5b-1, 5c-1 forming the phase modulator 5-1. Even in the case of occurrence of phase changes (0→$\pi$, $\pi$→0), a change in the phase of P'1 and a change in the phase of P'2 vary within the plane of the phase so as to become symmetrical to each other about the X axis. Hence, a Y-axis component in a drawing of the phase of the slave MZ waveguide 5a-1 is cancelled.

As mentioned above, even when the average amplitude of the driving voltage signals applied to the electrodes 5b-1 and 5c-1 of the phase modulator 5-1 is small, the phase of the light output as BPSK modulated light from the phase modulator 5-1 does not shift from the data sets "0" and "1" as indicated by C in FIG. 10, and the optical phases 0 rad and $\pi$ rad can be assigned to the data sets, respectively.

In contrast, as shown in FIG. 11, when the extinction ratio is not excellent, the radius of the circle of A differs from the radius of the circle of B; namely, the continuous light beams propagating through the bifurcated waveguides, where the electrodes 5b-1, 5c-1 are formed, differ from each other in terms of optical power. In this case, the radius of the circle of A is greater than that of the circle of B, and the continuous light propagating through the electrode 5b-1 becomes greater in power than the continuous light propagating through the electrode 5c-1.

However, when the extinction ratio of the phase modulator 5-1 (or 5-2), for which the average amplitude of the driving voltage signal has been made small, is not excellent, the change in the phase of P'1 and the change in the phase of P'2 become symmetrical to each other with respect to the X axis within the plane of the phase at the time of occurrence of phase changes (0→$\pi$, $\pi$→0). However, P'1 and P'2 differ from each other in terms of intensity. Accordingly, when P'1 and P'2 are merged together, the component in the direction of the Y axis is not cancelled, and the phase gradually changes, to thus cause a phase error.

Consequently, as indicated by C in FIG. 11, when the average amplitude of the driving voltage signal is made small, the optical phase of the BPSK modulated light, which is an output from the phase modulator 5-1, does not rotate up to 0 rad or $\pi$ rad.

Figure 9:
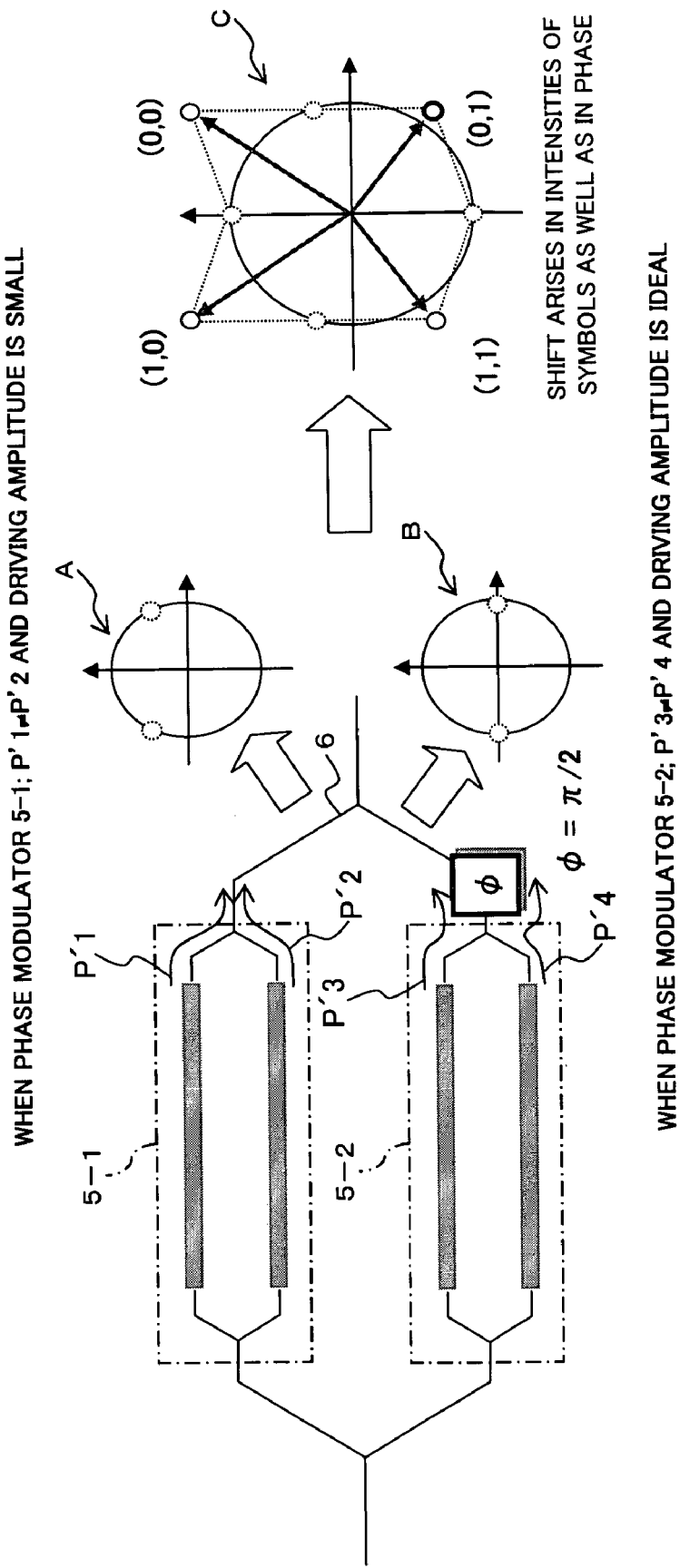

When being merged with the BPSK modulated light from the other phase modulator 5-2 by the MZM interferometer 6, such BPSK modulated light that does not rotate up to 0 rad or $\pi$ rad induces shifts in the phase and intensity of the previously-described symbols as indicated by C in FIG. 9. Such shifts in the phase and intensity of the symbols appear as variations in a high level value within the signal region (the symbol region), such as that shown in FIG. 4B, of the above-described sampling oscilloscope 12 in FIG. 2.

For these reasons, according to the present invention, a difference is created between the amplitude values of the pair of differential voltage signals, which form the driving voltage signal, such that the variations in the high level value within the signal region monitored by the sampling oscilloscope 12 disappear [see FIG. 4C], through the operation by means of which the gain control section 7 sets the gains of the amplifiers 2a, 2b (2c, 2d) of the amplifying section 2-1 (or 2-2).

Specifically, the phase error opposite to the phase shift— having arisen when the average amplitude of the driving voltage signal is reduced—is caused to arise by creating a difference in the amplitude values of the differential voltage signal, so that a phase error resulting from reduction of the average amplitude of the driving voltage signal is cancelled (see step A4 in FIG. 3).

As mentioned previously, in the situation where the average amplitude of the first driving voltage signal for the phase modulator 5-1 has been made small so as to suppress deterioration of signal quality induced by the unfavorable extinction ratio of the MZM interferometer 6 in the manner as mentioned above, when the pair of differential voltage signals v1 and v2, which are the driving voltage signals to be applied to the electrodes 5b-1 and 5c-1 of the phase modulator 5-1, assume the same amplitude value, the optical phase of the BPSK modulated light does not rotate from 0 to $\pi$ as shown in FIG. 11.

Figure 12:
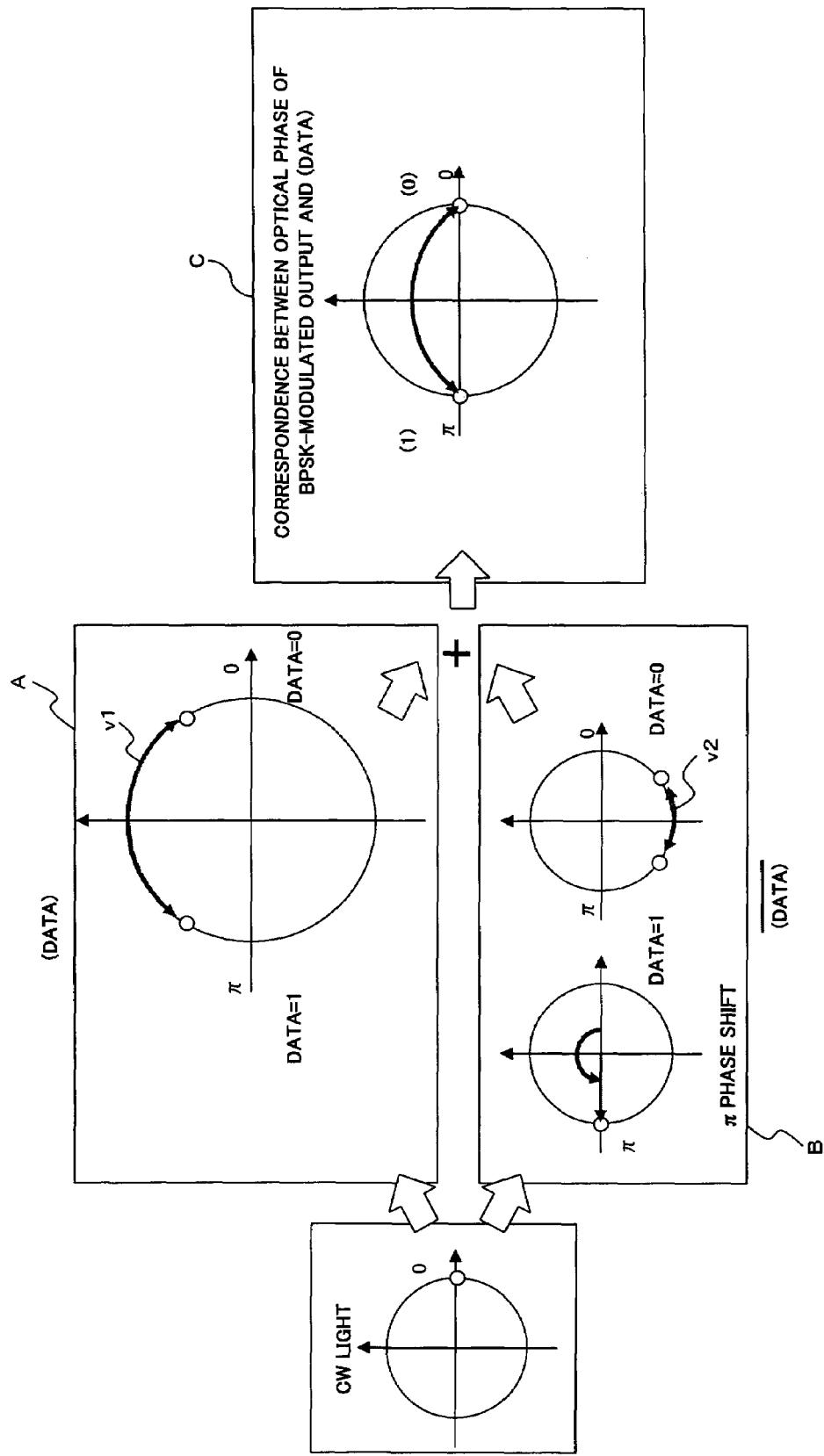

However, as indicated by, e.g., B in FIG. 12, when only the driving voltage signal v2 from the electrode 5c-1 where the continuous light propagating through the bifurcated waveguide gains low power is reduced further, the Y-axis component in the phase of the light that has been modulated by application of the driving voltage to the electrode 5c-1 can be made larger in the negative domain. Accordingly, the DQPSK modulated light (see C in FIG. 12) is used for canceling the Y-axis component in the phase of the light that has been modulated by application of the driving voltage to the electrode 5b-1 (see A in FIG. 12), thereby eliminating the optical phase shift from the DQPSK modulated light that is an output from the DQPSK modulator 10, to thus prevent occurrence of a shift in the intensity of the symbols.

Figure 13:
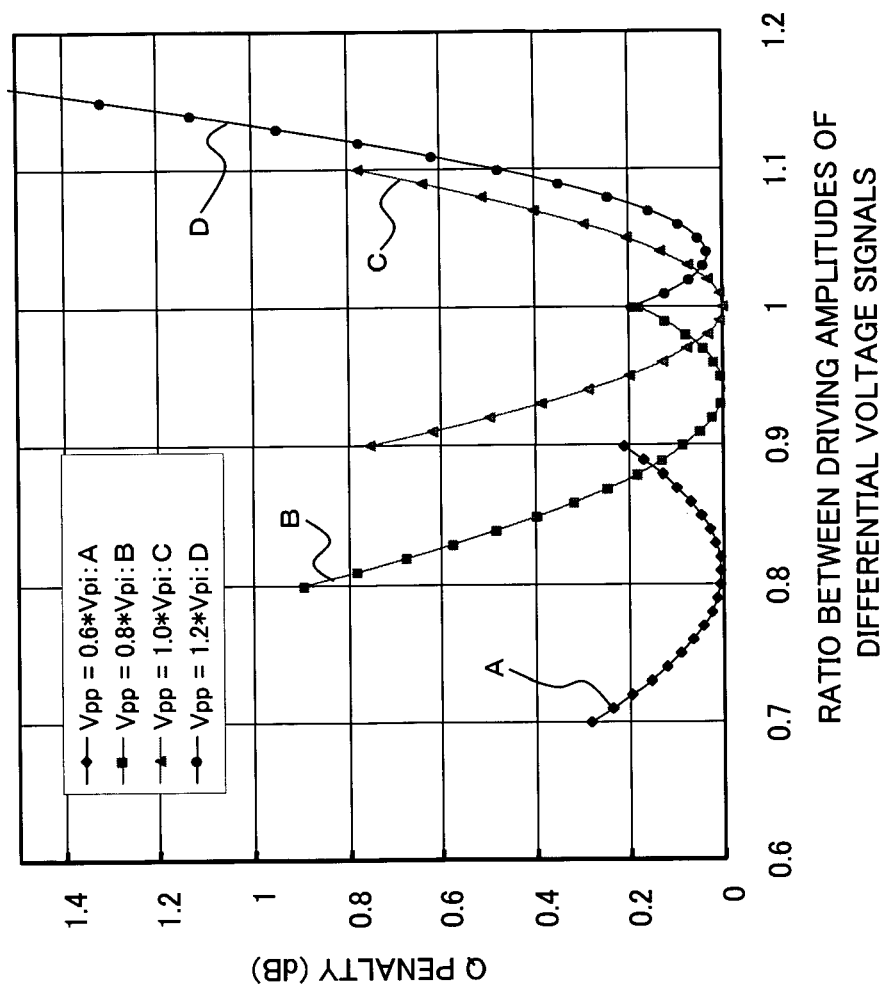

FIG. 13 is a view showing a result of simulation of a Q penalty (showing deterioration of signal quality) achieved when the ratio between the amplitude values of the pair of differential voltage signals is changed for each value Vpp of the average amplitude of the driving voltage signal (the driving amplitude of the driver) under the condition that the extinction ratios of the slave MZ waveguides 5a-1, 5a-2 forming the phase modulators 5-1, 5-2 are 20 dB and the extinction ratio of the MZM interferometer 6 serving as the master MZ waveguide is $\infty$ (the optical intensity components P1, P2 of the respective phase modulators 5-1, 5-2 in the merged DQPSK modulated light are equal to each other).

In FIG. 13, Vpi denotes an optimum value of the average amplitude of the driving voltage amplitudes. A denotes the Q penalty achieved in the case where Vpp=0.6*Vpi; B denotes the Q penalty achieved in the case where Vpp=0.8*Vpi; C denotes the Q penalty achieved in the case where Vpp=1.0*Vpi; and D denotes the Q penalty achieved in the case where Vpp=1.2*Vpi.

In the case shown in FIG. 13, the extinction ratio of the MZM interferometer 6 is set to $\infty$, the Q penalty becomes optimal under condition that the amplitude is not adjusted (Vpp=1.0*Vpi and the ratio between the amplitudes of the differential voltage signals=1). When the value Vpp of the average amplitude of the driving voltage signal of the one phase modulator (e.g., the phase modulator 5-1) is made smaller than the optimal value, signal quality is deteriorated, because the extinction ratios of the slave MZ waveguides 5a-1, 5a-2 are not excellent (20 dB) until the amplitude ratio between the differential voltage signals assumes a value of one.

However, as shown in FIG. 13, the amplitude ratio at which the Q penalty can be reduced to substantially 0 dB can be obtained according to the value of Vpp, by means of adjusting the ratio between the amplitudes of the differential voltage signals supplied, as driving voltage signals, to the phase modulator 5-1 for which the value Vpp of the average amplitude of the driving voltage signals has been reduced (i.e., by means of reducing the amplitude of one differential voltage signal).

Figure 14:
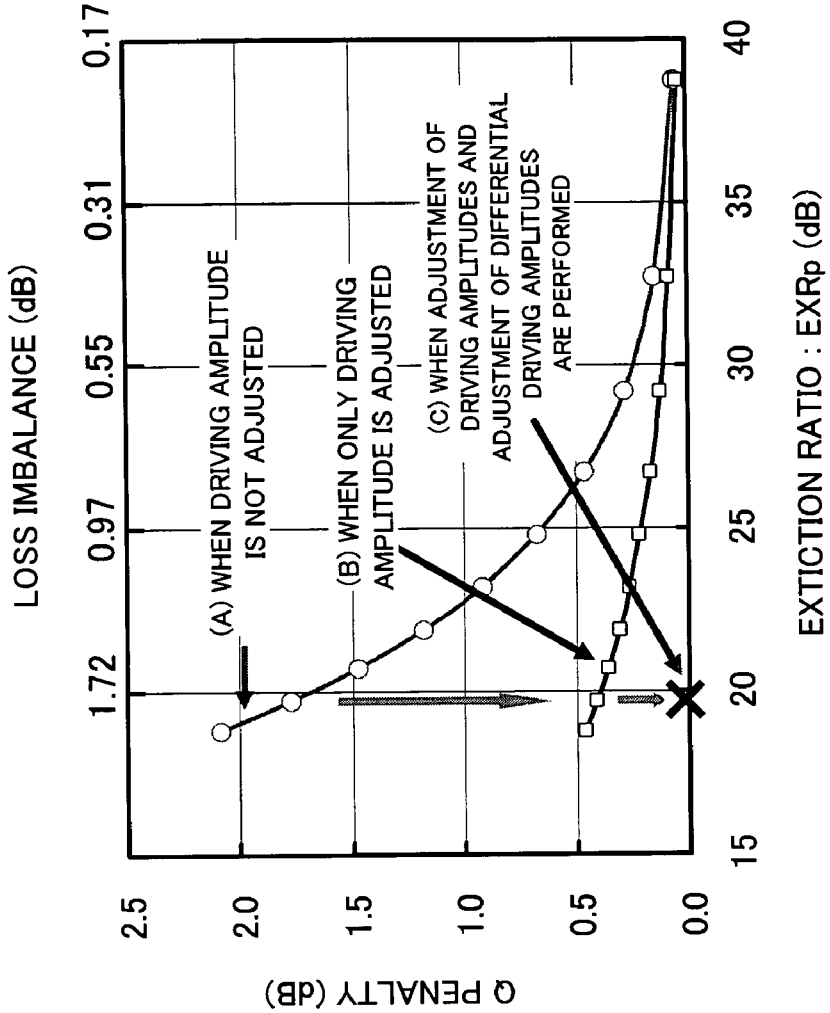

FIG. 14 is a view showing Q penalties complying with the extinction ratio of the MZM interferometer 6 in cases where: (A) neither adjustment of the value Vpp of the average amplitude of the driving voltage signal nor adjustment of the amplitude of one of signals forming the differential voltage signal is performed; (B) only the value Vpp of the average amplitude of the driving voltage signal is adjusted; and (C) both adjustment of the value Vpp of the average amplitude of the driving voltage signal and adjustment of the amplitude of one of signals forming the differential voltage signal are performed. As designated by A to C in FIG. 14, deterioration of the Q penalty can be suppressed to the greatest extent by means of performing adjustment of the value Vpp of the average amplitude of the driving voltage signal and adjustment of the amplitude of one of signals forming the differential voltage signal.

Figure 15:
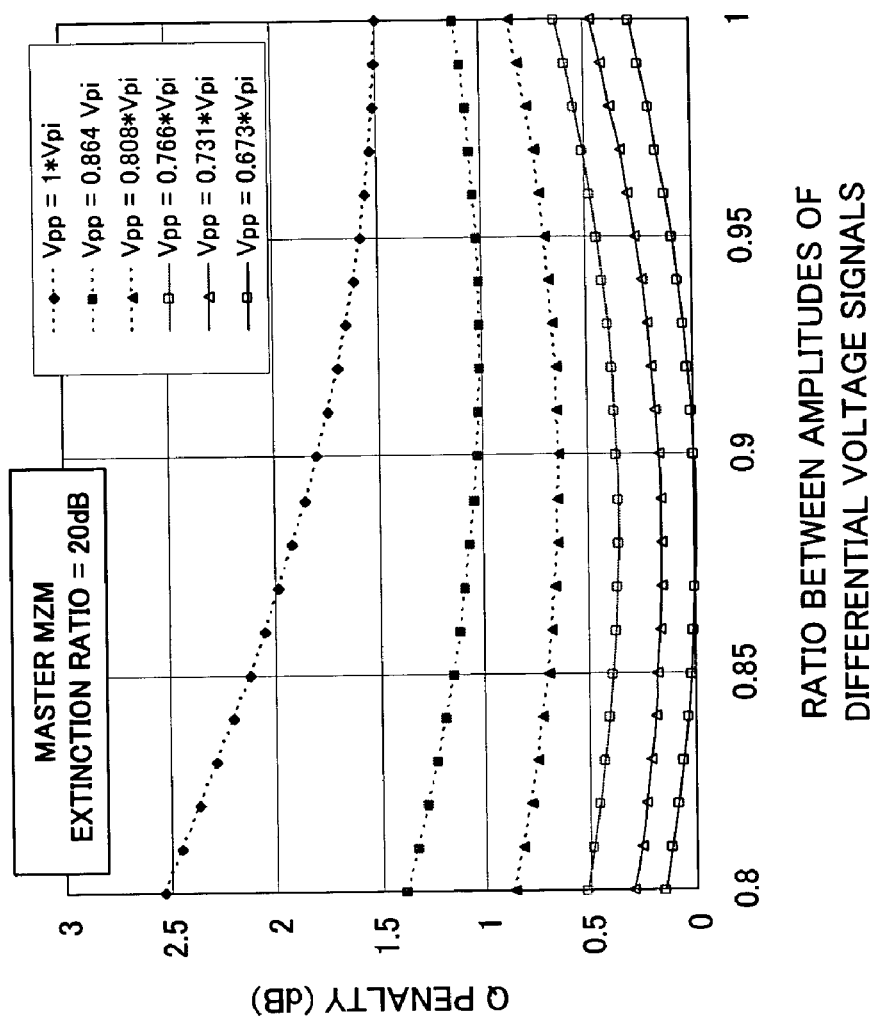

FIG. 15 is a view showing a result of simulation of a Q penalty achieved when the ratio between the amplitude values of the pair of differential voltage signals is changed for each value Vpp of the average amplitude of the driving voltage signal under the condition that the extinction ratios of the slave MZ waveguides 5a-1, 5a-2 forming the phase modulators 5-1, 5-2 are 20 dB and the extinction ratio of the MZM interferometer 6 serving as the master MZ waveguide is 20 dB.

In this case, since the extinction ratio of the MZM interferometer 6 is not excellent (20 dB), a Q penalty of about 1.5 dB a rises under the condition that the amplitude is not adjusted (Vpp=1.0*Vpi and an amplitude ratio between the differential voltage signals=1). However, deterioration of the Q penalty can be stemmed by means of reducing, e.g., the value Vpp of the average amplitude of the driving voltage signal of the phase modulator 5-1 and the ratio between the differential voltage signals supplied as the driving voltage signals to the phase modulator 5-1.

As shown in FIG. 15, it is understood that deterioration of a waveform induced by deterioration of an extinction ratio can be compensated by means of combining together adjustment of the driving amplitude of the phase modulator 5-1 with adjustment of driving amplitudes of the differential voltage signals. A percentage by which the value of the average amplitude of the driving voltage signal of the phase modulator 5-1 is reduced from the optimum value Vpi is set to, e.g., 0.673 or thereabouts, and the amplitude of the driving voltage supplied to one of the two electrodes 5b-1, 5c-1 of the phase modulator 5-1 is reduced (or the amplitude of the driving voltage supplied to the other electrode is increased) such that the ratio between the differential voltage signals falls within a range from 0.87 to 0.90 or thereabouts, to thus make the Q penalty optimal.

As mentioned above, according to the first embodiment of the present invention, the average amplitude of the first or second driving voltage signal is adjusted, and a difference can be created between the amplitudes of the differential voltage signals forming the first or second driving voltage signal. Hence, there are yielded an advantage of the ability to mitigate a request for stemming deterioration of the extinction ratio of the DQPSK modulator 10 by means of improving the quality of DQPSK modulated light in accordance with the individual difference of the extinction ratio due to variations in manufacture of a device, and the ability to expect improvement in yield and reduction of costs of an optical transmitter.

In the previously-described first embodiment, the average amplitude of the first or second driving voltage signal is adjusted, and the difference between the amplitudes of the differential voltage signals forming the first or second driving voltage signal is set. However, according to the present invention, the MZM interferometer 6 can enhance the quality of the DQPSK signal by means of adjusting the average amplitude of at least the first or second driving voltage signal in accordance with the individual difference of the extinction ratio due to variations in manufacture of a device. Accordingly, the above-described advantages can be acquired.

[A2] Description of Modification on First Embodiment

In the first embodiment, the settings for reducing the average amplitude of the driving voltage signal and the settings for inducing an imbalance between the differential driving amplitudes of the phase modulator 5-1 or 5-2 for which average amplitude has been reduced are performed through the setting and control of the gains of the amplifying sections 2-1, 2-2 performed by the gain control section 7. However, the present invention is not limited to these setting and control operations. As in the case of, e.g., the DQPSK modulator 10A shown in FIG. 16, the first and second driving voltage signals supplied to the phase modulators 5-1, 5-2 may be imparted with an attenuation level which is to be used for reducing the average amplitude or inducing an imbalance between the differential driving amplitudes.

Figure 16:
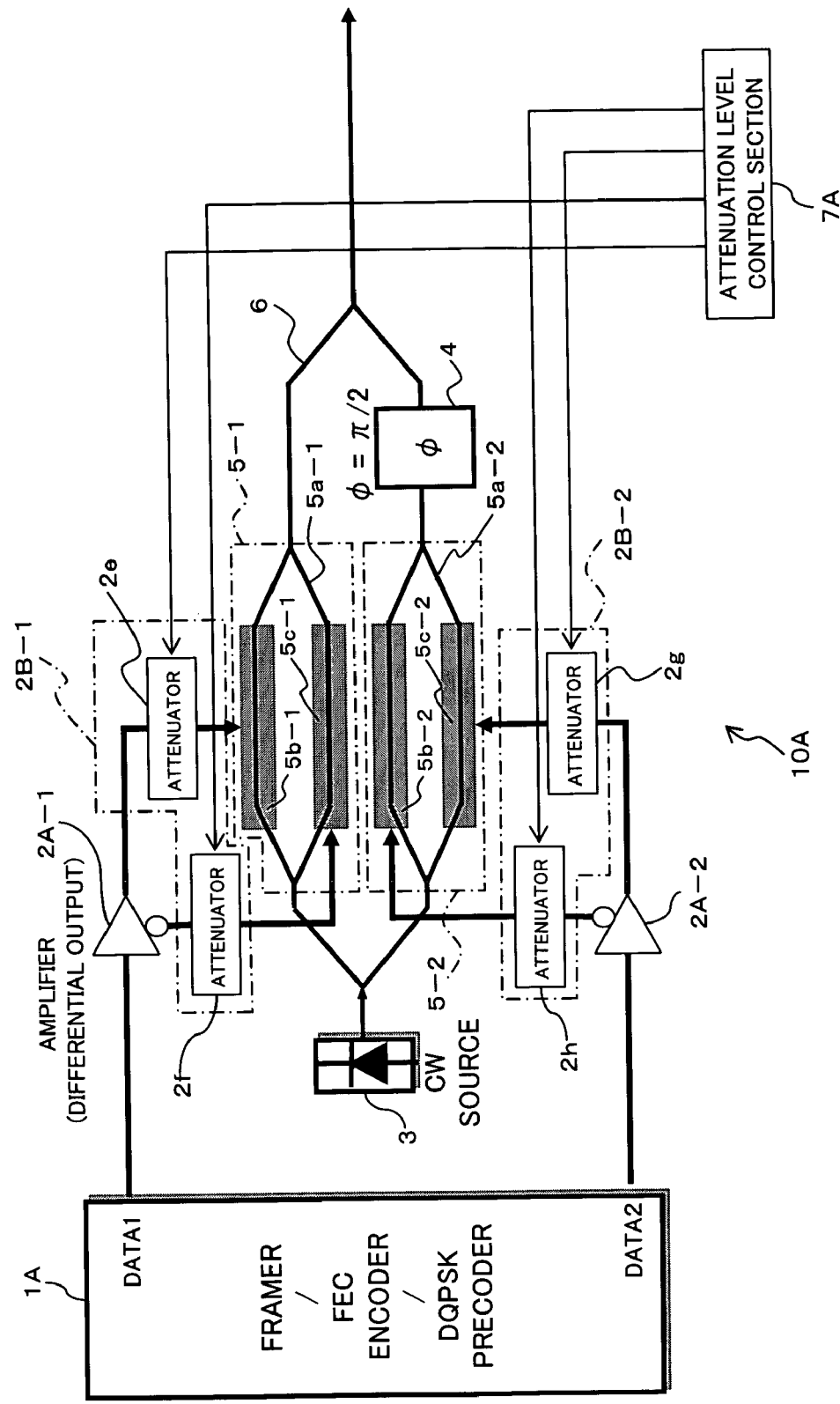
FIGS. 16 and 17 are views showing a modification of the first embodiment of the present invention.

Specifically, in contrast with the DQPSK modulator (see reference numeral 10) of the first embodiment, the DQPSK modulator 10A shown in FIG. 16 has first and second attenuation sections 2B-1, 2B-2 capable of imparting attenuation levels to the respective first, second driving voltage signals supplied to the phase modulators 5-1, 5-2. The DQPSK modulator 10A has, in place of the gain control section 7, an attenuation level control section 7A for setting and controlling the attenuation levels of the first, second attenuation sections 2B-1, 2B-2.

In the DQPSK modulator 10A shown in FIG. 16, a transmission data processing section 1A outputs data (Data #1, Data #2) of two channels, which are not differential signals; and amplifying sections 2A-1, 2A-2 amplify the data of the respective channels and output the amplified signals as differential voltage signals. The first attenuation section 2B-1 has first, second attenuators 2e, 2f for attenuating the differential voltage signal output from the amplifying section 2A-1, and the second attenuation section 2B-2 has third, fourth attenuators 2g, 2h for attenuating a differential voltage signal from the amplifying section 2A-2.

For instance, Agilent 84904,6,7 K/L Programmable Step Attenuator manufactured by Agilent Technology can be used as the previously-described first to fourth attenuators 2e to 2h.

Like the previously-described case shown in FIG. 2, the DQPSK modulator 10A outputs the DQPSK modulated light through use of a test signal generated by the pulse pattern generator 11. The sampling oscilloscope 12 monitors the DQPSK modulated light, to thus control the attenuation levels of the first, second attenuation sections 2B-1, 2B-2 such that variations in the center level of the intensity dip appearing in the region between the signals of DQPSK modulated light become smaller.

Put another way, the attenuation level control section 7A controls the attenuation level of any one of the first, second attenuation sections 2B-1, 2B-2, to thus control the average amplitude of the differential voltage signals forming one of the first, second driving voltage signal so as to become smaller than the average amplitude of the differential voltage signals of the other driving voltage signal, thereby suppressing deterioration of signal quality attributable to the extinction ratio of the MZM interferometer 6.

Moreover, because differences are provided between the gains of the amplifiers 2a, 2b, 2c, and 2d, the average amplitudes of the first, second driving voltage signals are adjusted to thus control the attenuation levels of the attenuators 2e, 2f of the attenuation section 2B-1 or the attenuators 2g, 2h of the attenuation section 2B-2, whichever attenuation section has been subjected to a reduction in average amplitude. Thereby, variations arise in the high level in the signal region of DQPSK modulated light.

Specifically, on the basis of the monitoring result of the sampling oscilloscope 12, the attenuation level of one driving voltage of the pair of differential voltage signals forming the first or second driving voltage signal for which the average amplitude has been reduced (or increased) is suppressed, such that the variations in the high level in the signal region of the DQPSK modulated light become smaller, thereby creating a difference between the amplitudes of the driving voltages of the first, second driving voltage signals.

Consequently, as in the case of the previously-described first embodiment, the average amplitude of the first or second driving voltage signal is adjusted. Subsequently, a difference can be provided between the amplitudes of the differential voltage signals forming either the first or second driving voltage signal. Accordingly, the quality of DQPSK modulated light is improved, and request for deterioration of the extinction ratio of the DQPSK modulator 10 is mitigated, leading to improved yield and cost-reduction of the optical transmitter.

In addition to the embodiment where the average amplitudes and the differential driving amplitudes of the first, second driving voltage signals are unbalanced on the basis of the monitoring result of the sampling oscilloscope 12, the present invention also enables effecting of settings for unbalancing the average amplitudes and the differential driving amplitudes, both of which have been described previously, by demodulating the DQPSK modulated light transmitted over the transmission path during operation of the apparatus, to thus optimize an error rate (BER: Bit Error Rate) of the received signal.

Figure 17:
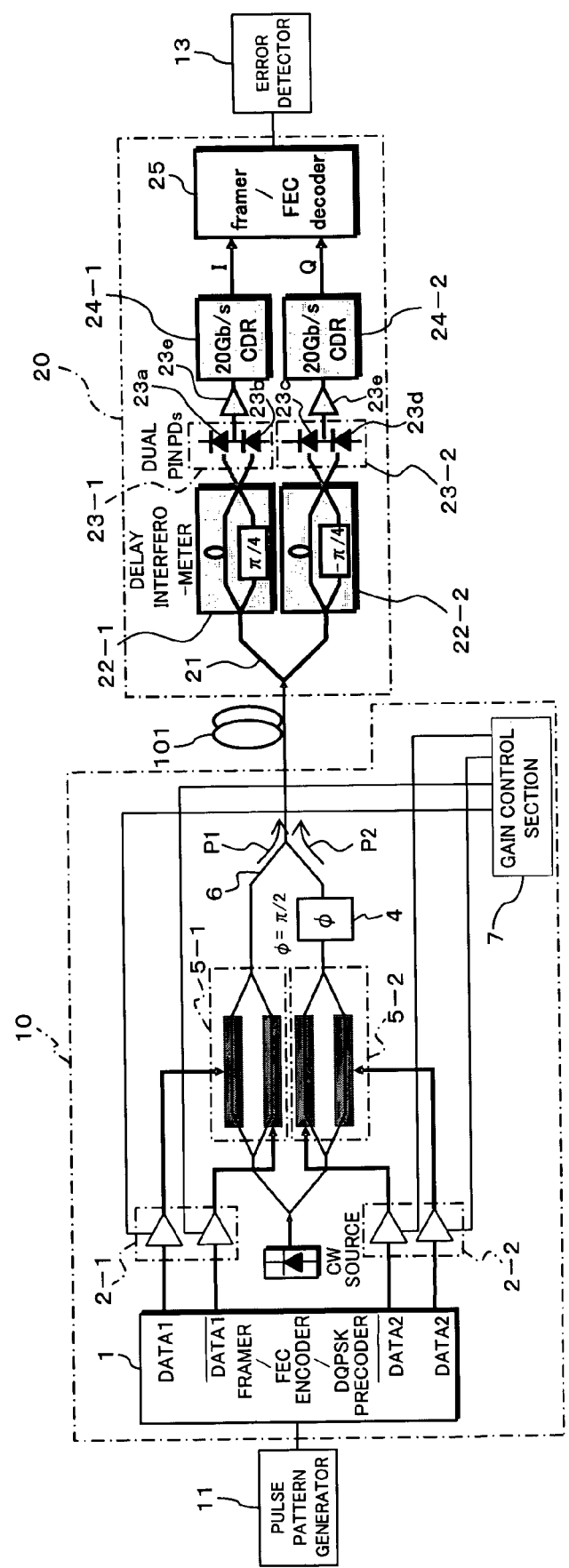

Since the average amplitudes and the differential driving amplitudes of the first, second driving voltage signals are adjusted such that an error rate is optimized, the error rate of demodulated data, for instance, can be measured by the configuration shown in FIG. 17. In FIG. 17, those reference numerals identical with the reference numerals shown in FIG. 2 designate the same sections.

The DQPSK demodulator 20 is connected to the DQPSK modulator 10 by way of a transmission path 101 and demodulates the DQPSK modulated light output from the DQPSK modulator 10. The DQPSK demodulator 20 has a bifurcating section 21 for bifurcating a received DQPSK optical signal. Delay interferometers 22-1, 22-2, photoelectric conversion sections 23-1, 23-2, and recovery circuits (CDR: Clock Data Recovery) 24-1, 24-2 are provided in the optical signal paths bifurcated by the bifurcating section 21. Moreover, the DQPSK demodulator 20 also has a received data processing section 25 for effecting framer/FEC decoder processing on the basis of the data signal recovered by the recovery circuits 24-1, 24-2.

As a configuration for measuring an error rate of the received signal, the received data processing section 25 is connected to an error detector 13 for measuring an error rate.

Signals, into which the DQPSK signal transmitted over the transmission path 101 has been bifurcated, are input to the delay interferometers 22-1, 22-2, respectively. The delay interferometer 22-1 causes a delayed component corresponding to a period of one bit (46.5 ps in the present embodiment) to interfere (in a delayed manner) with a component whose phase has been shifted through $\pi/4$ rad, to thus produce two outputs as results of interference. Alternatively, the delay interferometer 22-2 causes the delayed component corresponding to the period of one bit to interfere (in a delayed manner) with the component whose phase has been shifted through $-\pi/4$ rad (offset from the phase shift of $\pi/4$ rad of the delay interferometer 141-1 by $\pi/2$), thereby producing two outputs as results of interference.

The photoelectric conversion section 23-1 is formed from two pin photodiodes 23a, 23b which effect balanced detection upon receiving the two outputs from the delay interferometer 22-1. Similarly, the photoelectric conversion section 23-2 is formed from two pin photodiodes 23c, 23d which effect balanced detection upon receiving the two outputs from the delay interferometer 22-2. The received signals detected by the above-described photoelectric conversion sections 23-1, 23-2 are amplified as appropriate by an amplifier 23e.

The recovery circuit 24-1 is for recovering, from the optical signal received by the photoelectric conversion section 23-1, an I (In-phase) component pertaining to the clock signal and the data signal. Moreover, the recovery circuit 24-2 is for recovering, from the optical signal received by the photoelectric conversion section 23-2, a Q (Quadrature-phase) component pertaining to the clock signal and the data signal.

The received data processing section 25 performs framer/FEC decoding processing on the basis of the recovery signals output from the recovery circuits 24-1, 24-2. The error detector 13 measures an error rate (BER) on the basis of the number of error corrections, or the like, output from the received data processing section 25.

Figure 18:
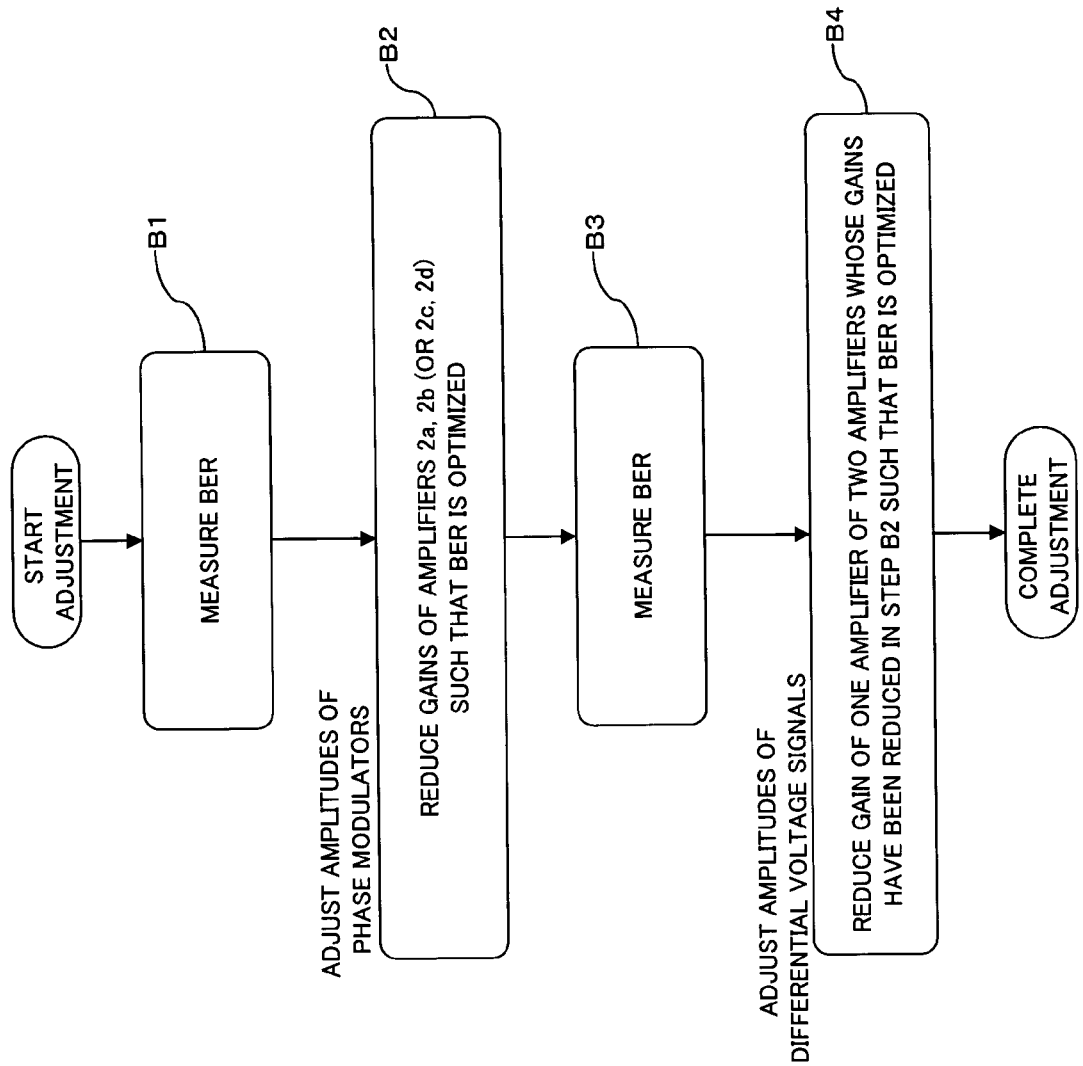
FIG. 18 is a flowchart for describing the operation of the modification of the first embodiment according to the present invention.

According to, e.g., the flowchart shown in FIG. 18, the gain control section 7 can also effect settings for unbalancing the above-described average amplitude and the differential drive amplitude such that the error rate measured by the above-described error detector 13 is optimized.

Specifically, the error detector 13 measures an error rate (BER) from the demodulated data pertaining to the DQPSK modulated light output from the DQPSK modulator 10 (step B1). On the basis of the result of measurement of the error rate, the average amplitude of the first or second driving voltage signal is adjusted such that the error rate becomes optimum, through setting of the gains of the amplifying sections 2-1, 2-2 performed by the gain control section 7 (step B2).

Put another way, when the extinction ratio of the MZM interferometer 6 is not excellent, a difference arises in the intensity components P1, P2 of the BPSK modulated light of two channels, which form the DQPSK modulated light. As indicated by A1 in FIG. 4A, when the value of any one of the data sets of two channels changes, variations are caused to arise in the dip by the data sequence whose data value has changed.

Since deterioration of the error rate primarily attributable to the above-described variations in the dip is caused to appear by the measurement performed by the error detector 13, the average amplitude of the first or second driving voltage signal is adjusted pursuant to the previously-described first embodiment such that the error rate becomes optimal, so that deterioration of signal quality due to the extinction ratio of the MZM interferometer 6 can be suppressed.

After the average amplitude of the first or second driving voltage signal has been adjusted as mentioned previously, the error detector 13 measures an error rate from the demodulated data pertaining to the DQPSK modulated light output from the DQPSK modulator 10 (step B3). On the basis of the result of measurement of the error rate, an amplitude difference is provided between the differential voltage signals forming the first or second driving voltage signal (step B4).

Put another way, variations (see FIG. 4B) in the high level value in the signal region (the symbol region) of the DQPSK modulated light, which arise when the average amplitude of the driving voltage signal of the phase modulator 5-1 or 5-2 whose extinction ratio is not excellent is reduced, appear in the form of deterioration of an error rate of the demodulated received signal. Consequently, an amplitude difference is created in the amplitudes of the differential driving signals forming the driving voltage signal to be sent to the phase modulator, for which the average amplitude of the driving voltage signal has been made small, such that the error rate becomes optimum, whereby deterioration of signal quality can be suppressed.

[B] Description of a Second Embodiment

Figure 19:
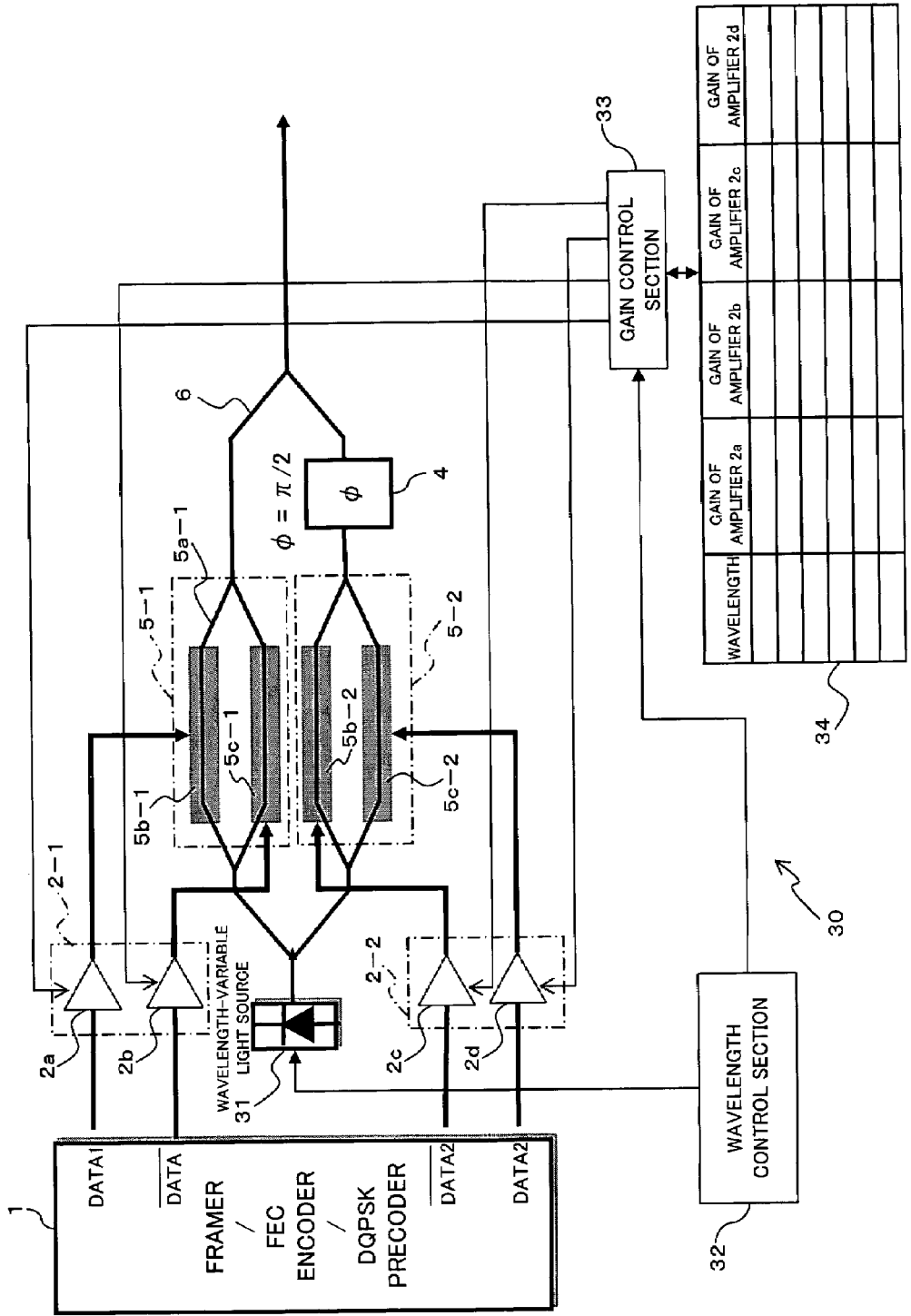
FIG. 19 is a view showing a differential quadrature phase-shift keying (DQPSK) modulator according to a second embodiment of the present invention.

FIG. 19 is a view showing a differential quadrature phase-shift-keying modulator (DQPSK modulator) 30 applied to a second embodiment of the present invention. The DQPSK modulator 30 shown in FIG. 19 has the transmission data processing section 1, the first, second amplifying sections 2-1 and 2-2, the phase modulators (Mach-Zehnder-type modulators) 5-1 and 5-2, the $\pi/2$ phase shift section 4, and the MZM interferometer 6, all of which are analogous to those of the previously-described first embodiment. Further, the DQPSK modulator 30 also has a wavelength-variable light source 31 serving as a CW light source; a wavelength control section 32 for controlling the wavelength of an output from the wavelength-variable light source 31; a gain control section 33; and a storage section 34. In FIG. 19, those reference numerals which are identical with those shown in FIG. 1 designate substantially the same sections.

The first, second amplifying sections 2-1, 2-2 amplify the first, second driving voltage signals to be supplied to the phase modulators 5-1, 5-2. The first amplifying section 2-1 has amplifiers 2a, 2b serving as first, second amplifiers which amplify a pair of differential voltage signals employed as the first driving voltage signal to be fed to the phase modulator 5-1. Similarly, the second amplifying section 2-2 has amplifiers 2c, 2d serving as third, fourth amplifiers which amplify a pair of differential voltage signals employed as the second driving voltage signal to be fed to the phase modulator 5-2.

The storage section 34 is for storing gain information employed as information about the voltage amplitudes of the first, second driving voltage signals which comply with the settings pertaining to the wavelength of the light output from the wavelength-variable light source 31 and are to be fed to the phase modulators 5-1, 5-2. Specifically, according to settings pertaining to the wavelength of continuous light to be modulated, the storage section 34 stores information about the gains of the amplifiers 2c, 2d that amplify the differential voltage signals forming the second driving voltage signal, along with information about the gains of the amplifiers 2a, 2b that amplify the differential voltage signals forming the first driving voltage signal.

The gain control section 33 receives, from the wavelength control section 32, wavelength control information about the continuous light output from the wavelength-variable light source 31, and acquires the gains set in the amplifiers 2a to 2d complying with the set wavelength of the light output from the wavelength-variable light source 31 by reference to the storage section 34, thereby controlling the amplifiers 2a to 2d so as to operate with the thus-acquired set gains.

Consequently, according to the settings pertaining to the wavelength of the light output from the wavelength-variable light source 31, the above-described gain control section 33 and the amplifying sections 2-1, 2-2 constitute a driving voltage amplitude control section for controlling the voltage amplitudes of the first, second driving voltage signals to be fed to the phase modulators 5-1, 5-2.

As to the information about the gains of the respective amplifiers 2a to 2d stored in the above-described storage section 34, information about the gains set according to the mode of gain control operation in the previously-described first embodiment is stored for each wavelength of the light output from the wavelength-variable light source 31.

Specifically, the extinction ratio of the MZM interferometer 6 and those of the phase modulators 5-1, 5-2 depend on the wavelength of light. Therefore, the storage section 34 stores the gains of the amplifiers 2a to 2d capable of optimizing deterioration of the signal attributable to the extinction ratio of the MZM interferometer 6 or those of the phase modulators 5-1, 5-2 according to the wavelength of the light output from the wavelength-variable light source 31.

Put another way, the gains of the amplifiers 2a to 2d are controlled according to the set information about the gains of the amplifiers 2a to 2d for respective output wavelengths stored in the storage section 34, so that the amplitude (a difference between the average amplitude and the driving voltage amplitude) of the driving voltage signal—at which deterioration of a signal attributable to the extinction ratio can be optimized—can be set according to the wavelength output from the wavelength-variable light source 31.

In this case, the storage section 34 stores information about settings for reducing, below the average amplitude of the differential voltage signals for the other driving voltage signal, the average amplitude of the differential voltage signals forming anyone of the first, second driving voltage signals in accordance with the output wavelength from the wavelength-variable light source 31, as well as for creating a difference between the amplitudes of the differential voltage signals for which the average amplitude has been made small.

Namely, the gain control section 33 reduces the average amplitude of the driving voltage signals applied to one of the phase modulators 5-1, 5-2, according to the settings about the wavelength of the wavelength-variable light source 31 by reference to the storage section 34. Further, the gain control section 33 controls the voltage amplitudes of the first, second driving voltage signals such that a difference is created between the amplitudes of the pair of differential voltage signals forming the driving voltage signal applied to one of the phase modulators 5-1, 5-2. In short, the gain control section 33 creates a difference in the settings pertaining to the gains of the amplifiers 2a, 2b or the settings pertaining to the gains of the amplifiers 2c, 2d, in accordance with the settings pertaining to the wavelength of the wavelength-variable light source 31.

In the DQPSK modulator 30 of the second embodiment of the present invention, the phase modulators 5-1, 5-2 are driven by the above-described configuration in accordance with the differential data signals of two channels output from the transmission data processing section 1, whereby the light from the wavelength-variable light source 31 is output after having undergone DQPSK modulation.

At this time, the characteristic of the extinction ratio of the MZM interferometer 6 and those of the extinction ratios of the phase modulators 5-1, 5-2 are dependent on the wavelength output from the wavelength-variable light source 31. Therefore, the storage section 34 is to store the settings about the gains of the amplifiers 2a to 2d complying with the output wavelength. Through these gain settings, the driving voltage amplitude—which optimally suppresses deterioration of signal quality attributable to an extinction ratio characteristic—can be set.

Specifically, by means of the gain settings pertaining to the first, second driving voltage signals stored in the storage section 34, points of quadrature-phase signals of the DQPSK modulated light output from the MZM interferometer 6 can be arranged essentially equidistant from the point of origin and in such a manner as to assume a phase relationship of $\pi/4$, $3\pi/4$, $5\pi/4$, and $7\pi/4$.

As mentioned above, the DQPSK modulator 30 of the second embodiment of the present invention yields an advantage of the ability to enhance the quality of DQPSK modulated light in accordance with individual differences in extinction ratio due to variations in manufacture of devices, in accordance with the output wavelength from the wavelength-variable light source 31; to suppress deterioration of the extinction ratio of the DQPSK modulator 30; and to attain improved yield and cost-reduction of the optical transmitter. Moreover, when such a DQPSK modulator 30 is applied to a wavelength-multiplexed optical communication system, the modulator contributes to cost-reduction of equipment compatible with respective wavelength channels, thereby leading to significant reductions in the cost of manufacture of an optical transmitter.

In the above-described second embodiment, there is obtained a driving voltage amplitude for enhancing the quality of the DQPSK modulated light according to the output wavelength, by means of controlling the gains of the first, second amplifying sections 2-1, 2-2 that amplify the differential data signal from the transmission data processing section 1. However, the present invention is not limited to the gain control. For instance, as shown in FIG. 20, the driving voltage amplitude may be acquired by controlling the attenuation level.

Figure 20:
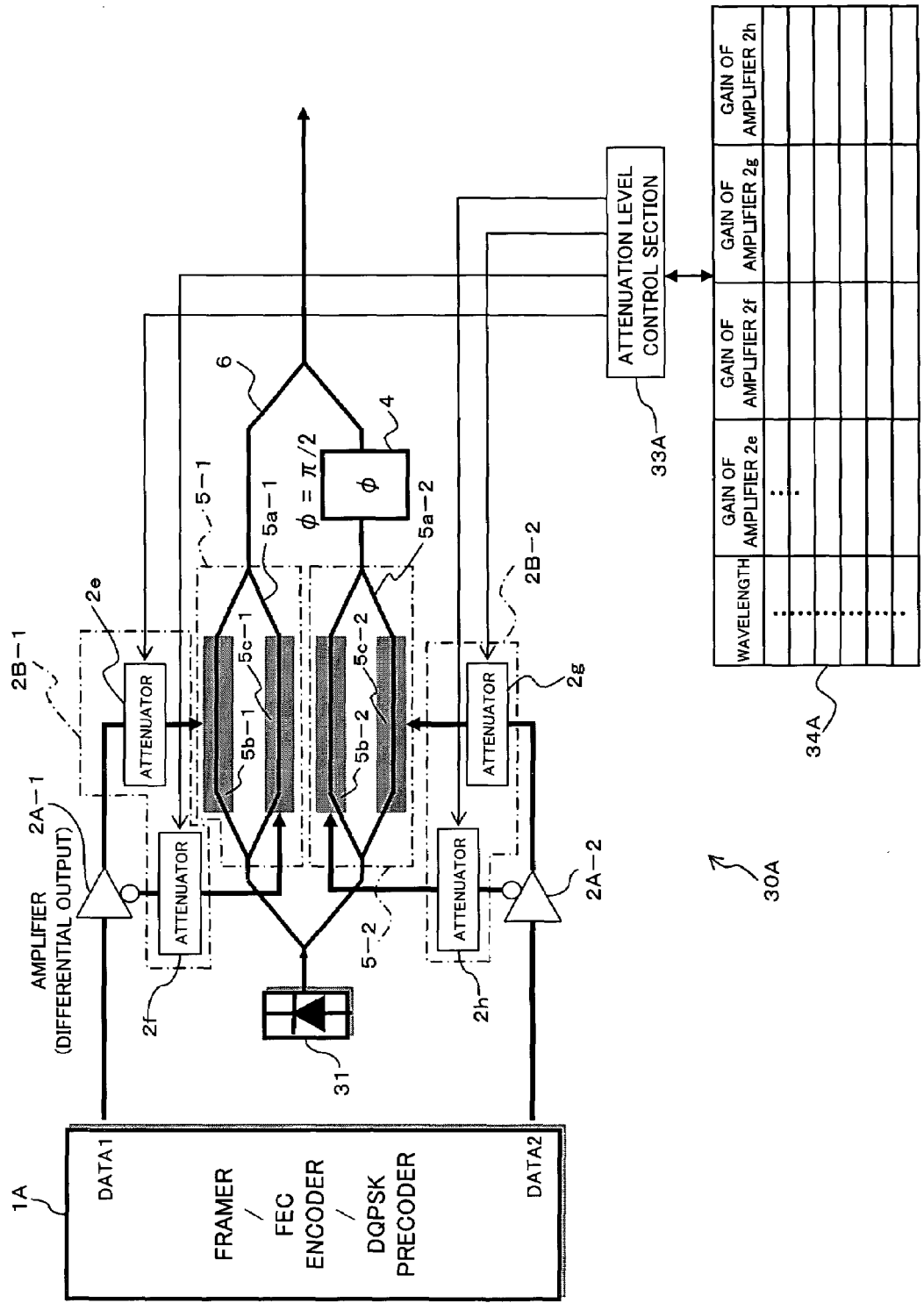
FIG. 20 is a view showing a differential quadrature phase-shift keying (DQPSK) modulator according to a modification of the second embodiment according to the present invention.

The DQPSK modulator 30A shown in FIG. 20 has a storage section 34A and an attenuation level control section 33A so that the CW light source 3 of the DQPSK modulator 10A shown in FIG. 16 is taken as the wavelength-variable light source 31 and so that the attenuation levels of the attenuators 2e to 2h can be set according to the wavelength output from the wavelength-variable light source 31. In FIG. 20, those reference numerals which are the same as those shown in FIG. 16 designate essentially the same sections.

The storage section 34A is for storing attenuation level information which corresponds to wavelength settings of the light output from the wavelength-variable light source 31 and is employed as information about the voltage amplitudes of the first, second driving voltage signals to be fed to the phase modulators 5-1, 5-2. Specifically, in conjunction with information about the attenuation levels of the attenuators 2e, 2f that attenuate the differential voltage signals forming the first driving voltage signal according to the settings about the wavelength of the modulated continuous light, the storage section 34A stores information about the attenuation levels of the attenuators 2g, 2h that attenuate the differential voltage signals forming the second driving voltage signal.

By reference to contents of the storage section 34A, the attenuation level control section 33A controls the attenuation levels of the first, second attenuation sections 2A-1, 2A-2 such that the driving voltage amplitudes of the first, second driving voltage signals become equal to the driving voltage amplitude corresponding to the wavelength settings. Accordingly, the above-described attenuation level control section 33A and the first, second attenuation sections 2B-1, 2B-2 constitute a driving voltage amplitude control section which controls the voltage amplitudes of the first, second driving voltage signals fed to the phase modulators 5-1, 5-2 according to the settings about the wavelength of the light output from the wavelength-variable light source 31.

Even in this case, as in the case of the above-described second embodiment, there is yielded an advantage of the ability to enhance the quality of the DQPSK modulated light according to the wavelength output from the wavelength-variable light source 31; to suppress deterioration of the extinction ratio of the DQPSK modulator 30; and to attain improved yield and cost-reduction of an optical transmitter.

[C] Others

In spite of the above-described embodiments, the present invention can be carried out while being modified in various manners within the scope of gist of the present invention.

For instance, in the above-described respective embodiments, with a view toward enhancing the extinction ratio of the MZM interferometer 6, the average amplitudes of the first, second driving voltage signals fed to the phase modulators 5-1, 5-2 are made unbalanced by making one of the average amplitudes lower than an optimal value. However, the present invention is not limited to unbalancing of the average amplitudes. For instance, the maximum amplitudes may be unbalanced, or average peak amplitudes may also be unbalanced.

The apparatus of the present invention can be manufactured on the basis of disclosure of the above-described embodiments.

What is claimed is:

1. A method for setting a driving voltage of a differential quadrature phase shift modulator which has a first Mach-Zehnder modulator capable of outputting first differential phase-shift modulated signal light by application of a first driving voltage signal forming a differential voltage signal based on first data and a second Mach-Zehnder modulator capable of outputting second differential phase-shift modulated signal light by application of a second driving voltage signal forming a differential voltage signal based on second data, and which outputs differential quadrature phase-shift modulated light by means of merging said first signal light and said second signal light, wherein driving voltage signals to be applied to said first and second Mach-Zehnder modulators in said differential quadrature phase-shift modulator are set, said method comprising:

acquiring signal quality of said differential quadrature phase-shift modulated light output from said differential quadrature phase-shift modulator, said signal quality being deteriorated due to an extinction ratio of the differential quadrature phase shift modulator; and adjusting to lessen, in accordance with the signal quality acquired, an amplitude of one of said first and second driving voltage signals than an appropriate condition thereof, in which said first and second driving voltage signals are under control so as to maximize a power of said differential quadrature phase-shift modulated light.

2. The method for setting a driving voltage of a differential quadrature phase-shift modulator according to claim 1, further comprising, after said adjustment of an amplitude of said first and second driving voltage signals, acquiring said signal quality of differential quadrature phase-shift modulated light output from said differential quadrature phase-shift modulator, and causing an amplitude difference in amplitudes of differential voltage signals forming said first and second driving voltage signals in accordance with signal quality of said acquired differential quadrature phase-shift modulated light.

3. The method for setting a driving voltage of a differential quadrature phase-shift modulator according to claim 2, wherein an eye pattern of said differential quadrature phase-shift modulated light output from said differential quadrature phase-shift modulator is monitored, and an amplitude of said first and second driving voltage signals is adjusted, based on a monitoring result, such that variations of an intensity dip appearing in a range between signals of said differential quadrature phase-shift modulated light become smaller; and, after said adjustment of an amplitude of said first and second driving voltage signals, an eye pattern of differential quadrature phase-shift modulated light output from said differential quadrature phase-shift modulator is monitored, and a difference is caused to arise in amplitudes of differential voltage signals forming said first and second driving voltage signals, based on said monitoring result, such that variations in a high level in a signal region of said differential quadrature phase-shift modulated light become smaller.

4. The method for setting a driving voltage of a differential quadrature phase-shift modulator according to claim 2, wherein an error rate is measured on the basis of demodulated data pertaining to differential quadrature phase-shift modulated light output from said differential quadrature phase-shift modulator, and an amplitude of one of said first and second driving voltage signals is adjusted on the basis of said error rate determined from a measurement result; and, after said adjustment of said amplitude of one of said first and second driving voltage signals, an error rate is measured on the basis of demodulated data pertaining to said differential quadrature phase-shift modulated light output from said quadrature phase-shift modulator, and a difference is caused to arise in amplitudes of differential voltage signals forming said first or second driving voltage signal, on the basis of a measurement result of said error rate.

5. The method for setting a driving voltage of differential quadrature phase-shift modulator according to claim 2, wherein an amplitude of one of said first and second driving voltage signal is adjusted by controlling an amplitude of a differential voltage signal forming one of said first and second driving voltage signals so as to become smaller than an amplitude of the other driving voltage signal; and a difference is caused to arise between amplitudes of said differential voltage signals forming one driving voltage signal whose amplitude has been made smaller.

6. A method for setting a driving voltage of a differential quadrature phase-shift modulator which has a first Mach-Zehnder modulator capable of outputting first differential phase-shift modulated signal light by application of a first driving voltage signal forming a differential voltage signal based on first data and a second Mach-Zehnder modulator capable of outputting second differential phase-shift modulated signal light by application of a second driving voltage signal forming a differential voltage signal based on second data, and which outputs differential quadrature phase-shift modulated light by means of merging said first signal light and said second signal light, wherein driving voltage signals to be applied to said first and second Mach-Zehnder modulators in said differential quadrature phase-shift modulator are set, said method comprising:

acquiring signal quality of said differential quadrature phase-shift modulated light output from said differential quadrature phase-shift modulator, said signal quality being deteriorated due to an extinction ration of the differential quadrature phase shift modulator; and adjusting to lessen, in accordance with the signal quality acquired, an amplitude of one of said first and second driving voltage signals than an appropriate condition thereof, in which said first and second driving voltage signals are under control so as to maximize a power of said differential quadrature phase-shift modulated light, further comprising, after said adjustment of an amplitude of said first and second driving voltage signals, acquiring said signal quality of differential quadrature phase-shift modulated light output from said differential quadrature phase-shift modulator, and causing an amplitude difference in amplitudes of differential voltage signals forming said first and second driving voltage signals in accordance with signal quality of said acquired differential quadrature phase-shift modulated light, wherein said differential quadrature phase-shift modulator has first and second amplifying sections for amplifying one of first and second driving voltage signals to be applied to said first and second Mach-Zehnder modulators;

an amplitude of one of said first and second driving voltage signals is adjusted by controlling gains of respective differential voltage signals forming first and second driving voltage signals to be amplified by said first and second amplifying sections; and a difference is caused to arise in amplitudes of differential voltage signals forming said first or second driving voltage signal by providing a difference between gains of said respective differential voltage signals forming one of said first and second driving voltage signals to be amplified by said first or second amplifying section.

7. A method for setting a driving voltage of a differential quadrature phase-shift modulator which has a first Mach-Zehnder modulator capable of outputting first differential phase-shift modulated signal light by application of a first driving voltage signal forming a differential voltage signal based on first data and a second Mach-Zehnder modulator capable of outputting second differential phase-shift modulated signal light by application of a second driving voltage signal forming a differential voltage signal based on second data, and which outputs differential quadrature phase-shift modulated light by means of merging said first signal light and said second signal light, wherein driving voltage signals to be applied to said first and second Mach-Zehnder modulators in said differential quadrature phase-shift modulator are set, said method comprising:

acquiring signal quality of said differential quadrature phase-shift modulated light output from said differential quadrature phase-shift modulator, said signal quality being deteriorated due to an extinction ration of the differential quadrature phase shift modulator; and adjusting to lessen, in accordance with the signal quality acquired, an amplitude of one of said first and second driving voltage signals than an appropriate condition thereof, in which said first and second driving voltage signals are under control so as to maximize a power of said differential quadrature phase-shift modulated light, further comprising, after said adjustment of an amplitude of said first and second driving voltage signals, acquiring said signal quality of differential quadrature phase-shift modulated light output from said differential quadrature phase-shift modulator, and causing an amplitude difference in amplitudes of differential voltage signals forming said first and second driving voltage signals in accordance with signal quality of said acquired differential quadrature phase-shift modulated light, wherein said differential quadrature phase-shift modulator has first and second attenuation sections which attenuate said first and second driving voltage signals to be applied to said first and second Mach-Zehnder modulators;

an amplitude of said first and second driving voltage signals is adjusted by controlling amounts of attenuation in respective differential voltage signals forming first and second driving voltage signals to be attenuated by said first and second attenuation sections; and a difference is caused to arise in amplitudes of differential voltage signals forming one of said first and second driving voltage signals by providing a difference between amounts of attenuation in said respective differential voltage signals forming said first and second driving voltage signals.

8. A differential quadrature phase-shift modulator comprising:

a wavelength-variable light source;

a first Mach-Zehnder modulator capable of outputting first signal light which is formed by subjecting light output from said wavelength-variable light source to differential phase-shift modulation, by application of a first driving voltage signal forming a pair of differential voltage signals based on first data;

a second Mach-Zehnder modulator capable of outputting second signal light which is formed by subjecting light output from said wavelength-variable light source to differential phase-shift modulation, by application of a second driving voltage signal forming a pair of differential voltage signals based on second data;

a phase-shift section for imparting a phase difference of $\pi/2$ between first and second signal light output from said first and second Mach-Zehnder modulators;

a merging section which merges said first and second signal light imparted with said phase difference of $\pi/2$ by said phase-shift section, to thus output differential quadrature phase-shift modulated light;

a storage section for storing voltage amplitude information about said first and second driving voltage signals to be applied to said first and second Mach-Zehnder modulators, said information complying with settings of a wavelength of light output from said wavelength-variable light source; and a driving voltage amplitude control section which controls voltage amplitudes of said first and second driving voltage signals to be applied to said first and second Mach-Zehnder modulators by reference to said storage section, in accordance with said settings of said wavelength of said light output from said wavelength-variable light source.

9. The differential quadrature phase-shift modulator according to claim 8, wherein said driving voltage amplitude control section has first and second amplifying sections for amplifying first and second driving voltage signals to be applied to said first and second Mach-Zehnder modulators; and a gain control section for controlling gains of said first and second amplifying sections by reference to contents of said storage section such that driving voltage amplitudes of said first and second driving voltage signals match said settings of said wavelength.

10. The differential quadrature phase-shift modulator according to claim 9, wherein said storage section stores voltage amplitude information about said first and second driving voltage signals complying with said set wavelength, in order to arrange points of four phase signals in differential quadrature phase-shift modulated light output from said merging section so as to become substantially equidistant from a point of origin and to assume phase relationships of $\pi/4$, $3\pi/4$, $5\pi/4$, and $7\pi/4$.

11. The differential quadrature phase-shift modulator according to claim 8, wherein said driving voltage amplitude control section has first and second attenuation sections for attenuating first and second driving voltage signals to be applied to said first and second Mach-Zehnder modulators; and an attenuation control section for controlling amounts of attenuation in said first and second attenuation sections by reference to contents of said storage section such that driving voltage amplitudes of said first and second driving voltage signals match said settings of said wavelength.

12. The differential quadrature phase-shift modulator according to claim 11, wherein said storage section stores voltage amplitude information about said first and second driving voltage signals complying with said set wavelength, in order to arrange points of four phase signals in differential quadrature phase-shift modulated light output from said merging section so as to become equidistant from a point of origin and to assume phase relationships of $\pi/4$, $3\pi/4$, $5\pi/4$, and $7\pi/4$.

13. The differential quadrature phase-shift modulator according to claim 8, wherein, by reference to said storage section, said driving voltage amplitude control section controls voltage amplitudes of said first and second driving voltage signals such that a difference arises between amplitudes of a pair of differential voltage signals forming a driving voltage signal applied to at least one of said first and second Mach-Zehnder modulators in accordance with said wavelength settings.

14. The differential quadrature phase-shift modulator according to claim 13, wherein said first amplifying section has first and second amplifiers for amplifying a pair of differential voltage signals forming said first driving voltage signal;

said second amplifying section has third and fourth amplifiers which amplify a pair of differential voltage signals forming said second driving voltage signal; and said gain control section causes a difference in gain settings of said first and second amplifiers or gain settings of said third and fourth amplifiers.

15. The differential quadrature phase-shift modulator according to claim 14, wherein said storage section stores voltage amplitude information about said first and second driving voltage signals complying with said set wavelength, in order to arrange points of four phase signals in differential quadrature phase-shift modulated light output from said merging section so as to become substantially equidistant from a point of origin and to assume phase relationships of $\pi/4$, $3\pi/4$, $5\pi/4$, and $7\pi/4$.

16. The differential quadrature phase-shift modulator according to claim 13, wherein said first attenuation section has first and second attenuators for attenuating a pair of differential voltage signals forming said first driving voltage signal;

said second attenuation section has third and fourth attenuators which attenuate a pair of differential voltage signals forming said second driving voltage signal; and said attenuation control section causes a difference in settings pertaining to amounts of attenuation in said first and second attenuators or settings pertaining to amounts of attenuation in said third and fourth attenuators, according to said wavelength settings.

17. The differential quadrature phase-shift modulator according to claim 16, wherein said storage section stores voltage amplitude information about said first and second driving voltage signals complying with said set wavelength, in order to arrange points of four phase signals in differential quadrature phase-shift modulated light output from said merging section so as to become substantially equidistant from a point of origin and to assume phase relationships of $\pi/4$, $3\pi/4$, $5\pi/4$, and $7\pi/4$.

18. The differential quadrature phase-shift modulator according to claim 13, wherein said storage section stores voltage amplitude information about said first and second driving voltage signals complying with said set wavelength, in order to arrange points of four phase signals in differential quadrature phase-shift modulated light output from said merging section so as to become substantially equidistant from a point of origin and to assume phase relationships of $\pi/4$, $3\pi/4$, $5\pi/4$, and $7\pi/4$.

19. The differential quadrature phase-shift modulator according to claim 8, wherein said storage section stores voltage amplitude information about said first and second driving voltage signals complying with said set wavelength, in order to arrange points of four phase signals in differential quadrature phase-shift modulated light output from said merging section so as to become substantially equidistant from a point of origin and to assume phase relationships of $\pi/4$, $3\pi/4$, $5\pi/4$, and $7\pi/4$.

20. The differential quadrature phase-shift modulator according to claim 8, wherein said storage section for storing voltage amplitude information about said first and second driving voltage signals to be applied to said first and second Mach-Zehnder modulators, said information complying with an extinction ratio of the differential phase-shift modulator depending upon settings of a wavelength of light output from said wavelength-variable light source; and a driving voltage amplitude control section which controls voltage amplitudes of said first and second driving voltage signals to be applied to said first and second Mach-Zehnder modulators by reference to said storage section, in accordance with said extinction ration of said wavelength of said light output from said wavelength-variable light source.

21. A method for setting a driving voltage of a differential quadrature phase shift modulator comprising:

outputting a light signal from a wavelength-variable light source;

forming a first signal light by subjecting the light signal to a differential phase-shift modulation, by application of a first driving voltage signal forming a pair of differential voltage signals based on first data;

outputting said first signal light through a first Mach-Zehnder modulator;

forming a second signal light by subjecting the light signal to a differential phase-shift modulation, by application of a first driving voltage signal forming a pair of differential voltage signals based on second data;

outputting said second signal light through a second Mach-Zehnder modulator;

imparting a phase difference of $\pi/2$ between the first and second signal lights;

merging the first and second signal lights to output differential quadrature phase-shift modulated light;

storing voltage amplitude information about said first and second driving voltage signals; and controlling voltage amplitudes of said first and second driving voltage signals to be applied to said first and second Mach-Zehnder modulators by reference to said stored voltage amplitude information.

22. An optical device comprising;
a first phase modulator;
a second phase modulator;
a splitter that provides the first phase modulator and the second phase modulator with different optical powers;
a modulation driver that provides the first modulator and the second modulator with driving signals;
a combiner that combines modulated optical signals output from the first modulator and the second modulator; and
a drive voltage controller that controls, in accordance with a quality of an optical signal output from the combiner, an amplitude of at least one of the driving signals such that each optical average power of optical components of the optical signal output from the combiner are approximately same.

23. The apparatus according to claim 22, wherein said splitter has a different split ratio 24. The apparatus according to claim 22, wherein said combiner has a different combine ratio.

25. An optical device comprising;
a first phase modulator;
a second phase modulator;
a splitter that provides the first modulator and the second modulator with optical powers;
a modulation driver that provides the first modulator and the second modulator with driving signals;
a combiner that combines modulated optical signals output from the first modulator and the second modulator; and
a drive voltage controller that controls, in accordance with a quality of an optical signal output from the combiner, an amplitude of at least one of the driving signals such that power of optical components of the optical signal output from the combiner are approximately same,
wherein losses of optical signal paths between said splitter and said combiner are different.

26. An optical device comprising;
a first phase modulator;
a second phase modulator;
a splitter that provides the first modulator and the second modulator with optical powers;
a modulation driver that provides the first modulator and the second modulator with driving signals;
a combiner that combines different optical powers of modulated optical signals output from the first modulator and the second modulator; and
a drive voltage controller that controls, in accordance with a quality of an optical signal output from the combiner, an amplitude of at least one of the driving signals such that each average power of optical components of the optical signal output from the combiner are approximately the same.

* * * * *

UNITED STATES PATENT AND TRADEMARK OFFICE
CERTIFICATE OF CORRECTION

PATENT NO. : 7,720,392 B2
APPLICATION NO. : 11/274824
DATED : May 18, 2010
INVENTOR(S) : Hisao Nakashima et al.

It is certified that error appears in the above-identified patent and that said Letters Patent is hereby corrected as shown below:

In the Claims:

Column 24, Line 45, change "signal" to --signals--.

Column 25, Line 4, change "ration" to --ratio--.

Column 25, Line 55, change "ration" to --ratio--.

Column 29, Line 21, change "ration" to --ratio--.

Signed and Sealed this
Fourteenth Day of May, 2013

Teresa Stanek Rea
*Acting Director of the United States Patent and Trademark Office*